United States Patent [19]

Pandeya

[11] 4,071,890

[45] Jan. 31, 1978

[54] CPU-SYNCHRONOUS PARALLEL DATA PROCESSOR APPARATUS

[75] Inventor: Arun K. Pandeya, Framingham, Mass.

[73] Assignee: Data General Corporation, Westboro, Mass.

[21] Appl. No.: 745,910

[22] Filed: Nov. 29, 1976

[51] Int. Cl.$^2$ .............................. G06F 9/18; G06F 9/16
[52] U.S. Cl. ................................................ 364/200
[58] Field of Search ........................................ 364/200

[56] References Cited

U.S. PATENT DOCUMENTS

| | | | |
|---|---|---|---|
| 3,593,299 | 7/1971 | Driscoll et al. | 364/200 |
| 3,713,107 | 1/1973 | Barsamian | 364/200 |
| 3,902,162 | 8/1975 | Parkinson et al. | 364/200 |
| 3,988,717 | 10/1976 | Kisylia | 364/200 |

*Primary Examiner*—Melvin B. Chapnick
*Attorney, Agent, or Firm*—Joel Wall; Jacob Frank

[57] ABSTRACT

At least one parallel processor (PP or P-P) is connected between a central processing unit (CPU) interface and main memory for processing certain data simultaneously and synchronously with operation of the CPU. Integrated circuit apparatus for implementing the functions performed by the PP includes an arithmetic and logic unit (ALU), a set of registers, microprogrammable circuitry (RAM's, ROM's, PROM's) and other integrated circuitry. The PP includes decode and control apparatus, which decodes microinstructions stored in an extension to the control store of the CPU, the extension forming part of the CPU/P-P interface, and thereafter employs the decoded microinstructions to control operation of the P-P.

8 Claims, 22 Drawing Figures

CPU-SYNCHRONOUS PARALLEL DATA PROCESSOR APPARATUS

CROSS-REFERENCE TO RELATED APPLICATIONS

Application entitled "CPU/PP Interface With Microcode Extension", Ronald H. Gruner, bearing Ser. No. 745,898 filed on even date herewith.

BACKGROUND OF THE INVENTION

1. Field of the Invention

The present invention generally relates to an improved data processing system and more specifically relates to parallel processor (P-P) apparatus employed within the system which operates simultaneously, synchronously, and in parallel with operation of the central processing unit (CPU).

2. Description of Prior Art

The data processing art is progressing at a fast pace. One of the main areas of improvement lies in the direction of faster operating speeds, or, conversely, less time needed by the system to perform a particular operation. Over the years there have emerged advances in technology and improved design techniques which made possible the presently available high system operating speed. The present invention is yet another step in this direction of data processing progress.

One of the breakthroughs in technology contributing to reduced system operation or cycle time can be found in the semiconductor industry and is commonly termed microstructure, minute electronic integrated circuit memories capable of storing binary information under control of a human programmer. Binary information, stored in "tables", can be tailored to represent specific mathematical functions. When other binary information is used sequentially in a microprogram, it can control operation of these tables, thus implementing a solution to a particular problem. Microstructures are referred to as ROM (read only memory) and RAM (random access memory) sometimes collectively referred to as control store, and PROM (programmable read only memory) sometimes referred to as writable control store. These control stores are constructed from semiconductor material typically MOS (metal oxide semiconductors), or bipolar.

One of the data processing design techniques which contributed to improved speed of operation lies not within the hardware realm, but lies within the software (programming) realm, and this technique is sometimes referred to as sub-routining. A data processing system normally operates under control of a main program, a set of instructions stored as binary information in main memory and sequentially followed by the apparatus of the system until the solution is obtained. A sub-routine is a portion of that program, a predetermined set of instructions which can be called upon at pre-selected points in the main program. The sub-routine contributes a specific set of predetermined instructions to solve a predetermined task in a highly efficient manner each time it is called upon (or accessed), whereafter the main program continues to run. Use of highly efficient sub-routines to solve specific tasks provides more efficient programming, whereby the solution is derived faster, providing a higher speed of operation.

It is thus a challenge and problem continually confronting those contributing to this art, to generate new means for processing binary data more quickly than before. Applicant provides a novel solution to this problem with the present invention.

In a sense, the present invention relates to utilization of the technology advance of microstructure hardware to solve a particular problem in the hardware realm in a highly efficient manner, the problem otherwise lending itself to solution by employment of sub-routines in the software realm. However, the additional advantage of permitting CPU-microcode-controlled operation of the present invention with simultaneous operation of the CPU, permits even additional speed of operation to be obtained when compared with the software realm, since the main program must be halted during a sub-routining operation.

SUMMARY OF THE INVENTION

The present invention relates to a Parallel Processor (PP). The PP is functionally connected between the CPU/PP interface and main memory of a data processing system, timing derived from the CPU clock, for processing data simultaneously and synchronously with operation of the CPU. The P-P includes decode and control apparatus for decoding microinstructions stored in an extension to the control store of the CPU, the extension forming part of the interface, and thereafter for controlling operation of the PP with the decoded microinstructions. The processor further comprises data transferring means, register file or set of registers, an arithmetic and logic unit (ALU) connected from the register file, a plurality of PROM table apparatus each performing a particular mathematical operation on its respective binary word input, other registers for temporarily storing results of the various mathematical operations, means for addressing main memory with a representation of data which has been operated upon by one of the plurality of PROM structures, and means for operating upon binary words stored in the memory location addressed by the addressing means. The data transfer means transfers output of the operating means to that addressed memory location.

It is advantageous to employ structure of the present invention within a data processing system for certain applications, to synchronously and simultaneously operate upon certain of the data being processed by the system, whereby overall processing time is reduced. Among other advantages are efficiency and flexibility of operation wherein almost any number of microstructures (PROMs, etc.) can be employed to implement one or more algorithms, (an algorithm is a step-by-step procedure for solving a problem), a particular algorithm thus being subject to repeated execution at various points if so required within the overall program of the data processing system.

It is thus a general object of the present invention to provide an improved data processing system.

It is a further object of the present invention to provide a novel parallel processor to increase operating speed and efficiency of a data processing system.

It is an additional object of the present invention to provide an improved electronic data processing system including a parallel processor for synchronously and simultaneously processing certain data.

Other objects and advantages of the present invention will become apparent to those skilled in the art after referring to the detailed description of the appended drawings, wherein:

DESCRIPTION OF THE PREFERRED EMBODIMENTS

Figure 1:
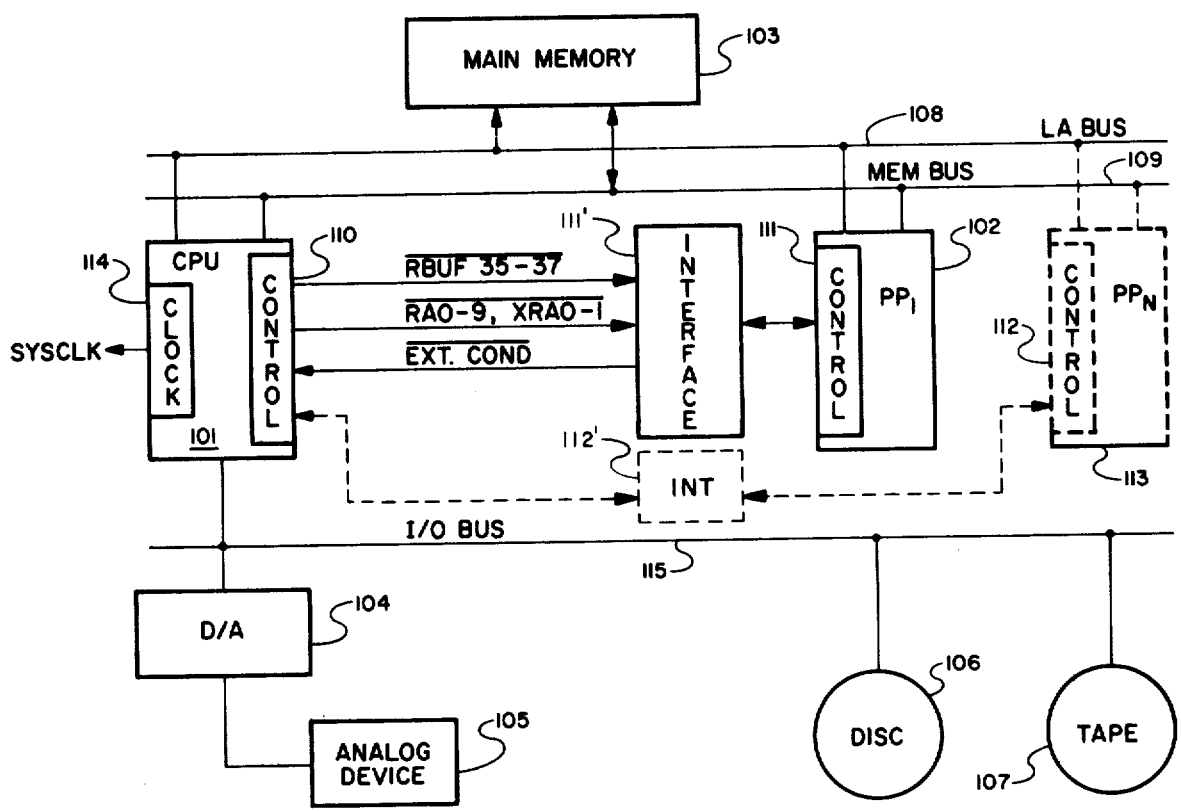
FIG. 1 depicts a functional block diagram of a data processing system in which an illustrative embodiment of the present invention is employed.

By way of introduction to this detailed description of the present invention, this section is organized into two main areas. The first area is a detailed description of the interconnection of the circuitries and the second area is a description of operation of and cooperation between elements or components of tne present invention, and problems solved thereby. In this connection, it should be observed that FIG. 3A contains apparatus elements having reference numerals within the 300 range of numerical designations. Each of these apparatus elements is further detailed in a separate diagram which is keyed by its "300" range designation. Accordingly, one can readily refer to both a detailed figure and its respective position within FIG. 3A, in the interest of ease of presentation.

FIG. 1

Referring then, to FIG. 1 depicting a block diagram of a data processing system incorporating the present invention, main memory 103 is interconnected to LA BUS 108 and MEMBUS 109. The connections are shown in single-line construction, but it is to be understood that pluralities of conductors are represented thereby; this applies to FIG. 1 and FIGS. 3-3A. A binary word (or binary information) which is conducted over that group of conductors comprising LA BUS 108 is a binary address word, represents an address of main memory 103, and addresses memory 103 thereby. A binary word (or binary information) of predetermined bit length (e.g., 16 bits) conducted over a plurality of conductors comprising bi-directional MEMBUS 109 represents data being transferred into (written into) or out from (read from) main memory 103. By comparison, LA BUS 108 is uni-directional whereby address words are conducted only to and not from main memory. CPU 101 is also connected to LA BUS 108 and MEMBUS 109 as shown. Clock 114, shown within CPU 101, provides synchronization and timing signals to CPU 101, and by way of signal SYSCLK and other signals such as $\overline{\text{STOP CPU}}$ described later with respect to FIG. 4B, to the remainder of the system. I/O BUS 115 is connected from CPU 101 to peripheral devices D/A converter 104, disc 106, and tape 107. Analog device 105 is connected from D/A converter 104 and is responsive to analog signals from 104. Other peripherals can be connected to I/O BUS 115 as required. Control 110 is included within CPU 101; control 110, responsive to clock signals (or timing signals) from clock 114, provides various control signals to control operation of the system. What has thus far been described with regard to FIG. 1 may be a standard arrangement for components of a data processing system.

Parallel Processor (PP) 102 is connected from main memory 103 by way of LA BUS 108 and MEMBUS 109. CPU 101, by way of its control 110 extends control signal lines $\overline{\text{RBUF 35-37}}$, $\overline{\text{RAO-9}}$, $\overline{\text{XRAO-1}}$, and $\overline{\text{EXT-COND}}$ to interface 111'. Interface 111' then connects into PP control 111. The connection between P-P 102 and CPU 101 is thus made between control 110 from CPU 101 via interface 111' to decode and control 111 from P-P 102.

PP 113 ($PP_N$) shown in dashed line construction represents a plurality (N-valued) of processors that can each be connected in parallel with P-P 102. Similarly, control 112 depicts the respective plurality of decodes and controls and interface 112' depicts the respective plurality of interfaces, each 112 and 112' structure associated with one of the processors 113 connected in parallel with processor 102. It should thus be understood that more than one processor and interface combination can be connected to control structure 110. The present invention is thus not limited to use within a single parallel processor/interface combination.

It should be understood, and will become more apparent after further consideration, that interface 111' (and interfaces 112' as well) perform a particular mating function; the function is separate and distinct from the functions performed in either the CPU or the PP. The interface is thus shown physically separated from both the CPU and PP in FIG. 1, primarily for purposes of clarity of illustration. It is to be understood, however, that attachment of the physical structure embodying the interface to either the CPU or to the PP is possible, (and no attachment to either is also possible) the choice of location being made based on electronic hardware construction considerations. The particular functional individuality and identity of the interface is not altered, diminished, or diluted as a result of its being located at any given location within the data processing system.

FIG. 2

Figure 2:
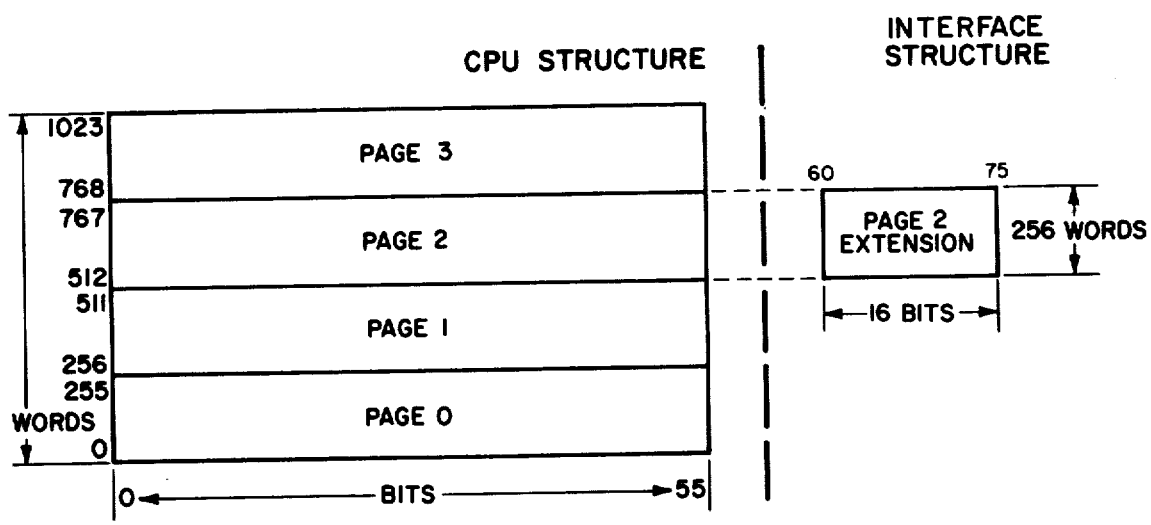
FIG. 2 is a schematic representation of control storage space as divided into pages within a microstructure of the system of FIG. 1.

Referring to FIG. 2, there is shown a schematic representation of a control store field as it may be conceived to exist within the microstructure (PROMs, ROMs, etc.) or control 110 and interface 111' of FIG. 1. This microprogram control store, being constructed from semiconductor materials, can be made to store information in the binary sense of either having or not having a measurable parameter, for example, as either having or not having detectable voltage. Physical space which comprises these microstructures can thus be conceived of as being "punched", as one would punch out holes from a piece of cardboard leaving thus holes and no holes to provide binary information. Memory space can thus be mapped out, and these mapped-out areas can be referred to as pages, a page of memory being a term of art.

Each of the plurality of pages is arranged to contain 256 words of predetermined 56 bit length per word. Each of the words can be given an address numbered consecutively 0 through 1023, thus providing 1024 memory locations or addresses for the four pages shown. However, with regard to page two, there has been an extension thereof of another 16 bits providing a modified microprogram control store, whereby the 256 words associated with page two are not 56 bits long but are 72 bits long; 56 bits of page two memory are associated with CPU 101 and 16 bits of page two memory are associated with interface 111'. It is information stored in the page two extension which is the modified microprogram from which control of operation of P-P 102 is derived. Further detail regarding this microstructure will be presented herein-below. There is thus shown a system controller 110 including a microprogram control store of four pages of predetermined word length equal to 256 words, and an interface 111' having, among other items, a modified microprogram.

FIGS. 3 AND 3A

Figure 3:
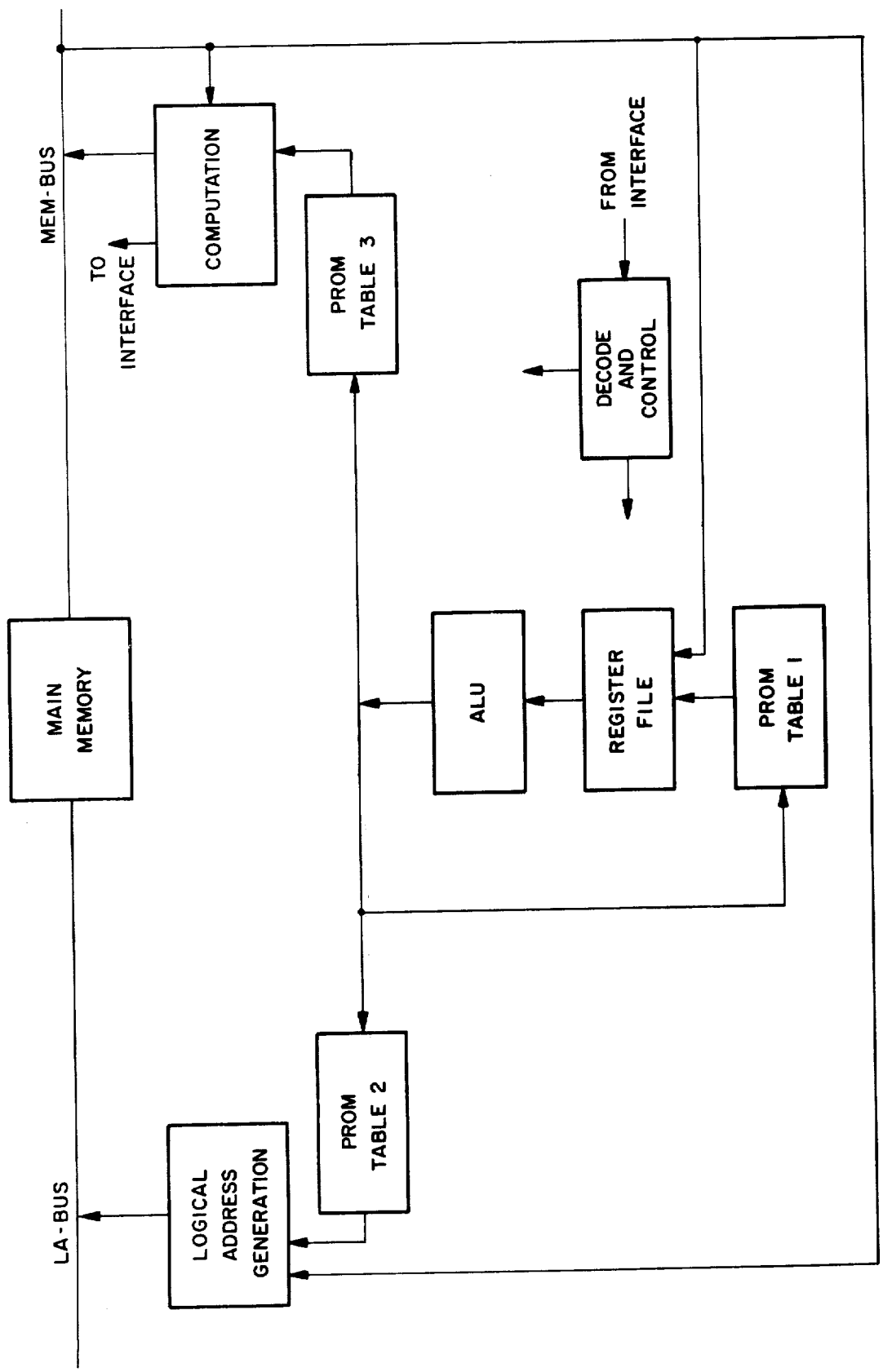
FIGS. 3 and 3A are functional block diagrams of parallel processors employed within the system of FIG. 1.

FIG. 3 shows the interconnection of a parallel processor (of the type employed in FIG. 1) between main memory and interface, in some functional detail. There are shown three PROM tables, along with ALU, register file, logical address generate, computation, and decode and control blocks. The information flow is in the direction of the arrows, where each interconnecting line represents parallel transfer of a plurality of binary bits. The decoded signals derived from the microinstructions stored in the interface are used to control the various blocks depicted, this control being represented by the two arrows or directed lines from the decode and control block. The computational result is conducted to MEM-BUS and/or to interface as depicted. More detail regarding interconnection and data flow between various blocks of FIG. 3 is presented in connection with the more-detailed diagram FIG. 3A, hereinbelow. However, FIG. 3 represents the general novel scheme of PP 102, and it should be understood that particular implementations of the circuit structure within each of the blocks depicted can take various forms, FIG. 3A thus depicting one of those embodiments.

Figure 3A:
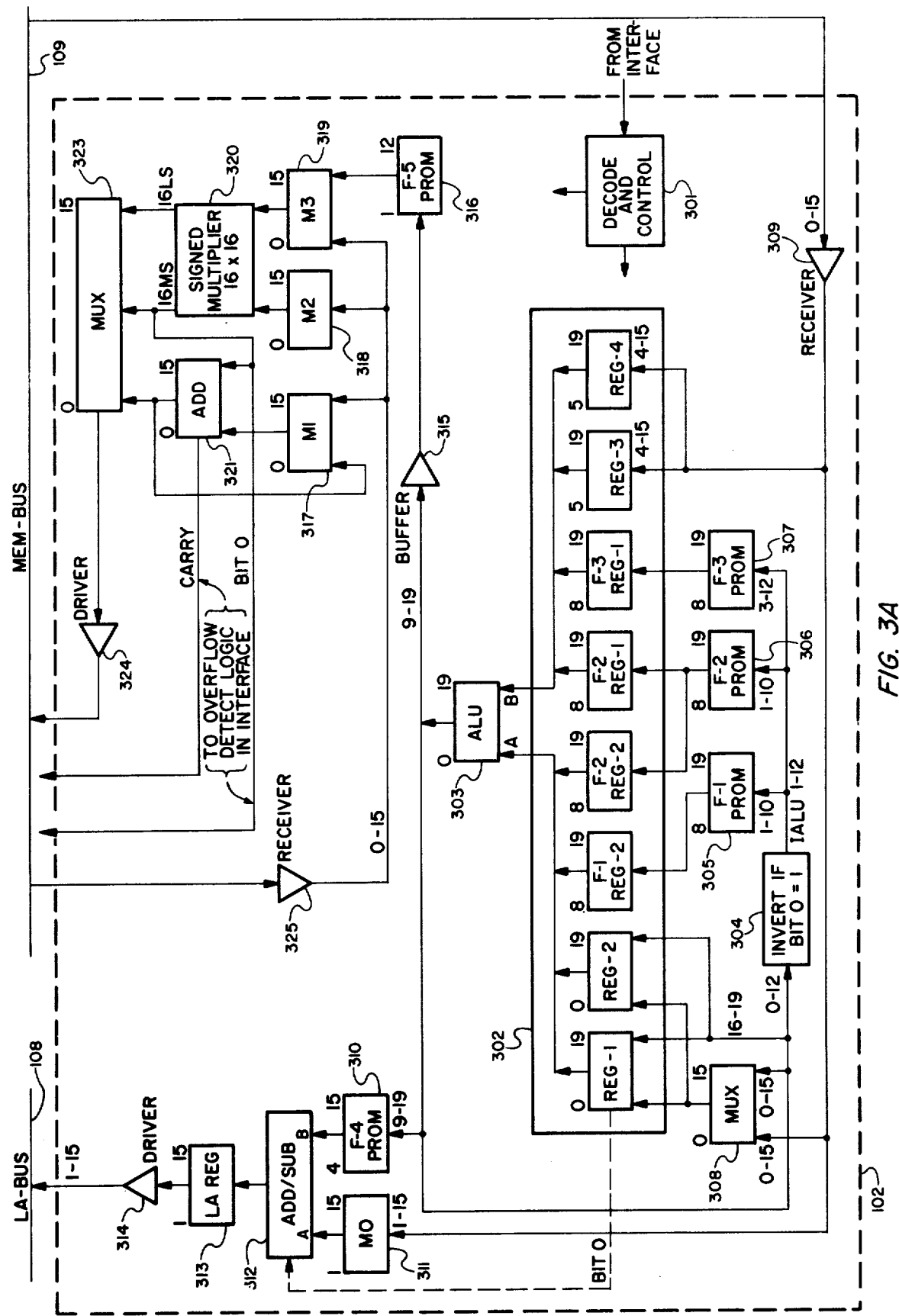

By way of introduction to FIG. 3A P-P 102 is shown contained within dashed line 102, connecting with LA BUS 108 and MEMBUS 109, and receiving microinstructions from interface 111'. All components 301–325 within dashed line 102 are contained within P-P 102 of FIG. 1. The small numerical designations associated with the components and connections therebetween represent limits to the range of bits received by and transmitted from that particular block; for example, with regard to register REG-1, yet to be discussed, the designation 0 on the upper left-hand side and the designation 19 on the upper right-hand side of that component is interpreted to mean that bits 0 through 19 (20 bits) are conducted from REG-1 to the A input of yet to be discussed ALU 303; similarly, the bits 0 to 15 from multiplexer 308 yet to be discussed are conducted as one input to register REG-1, and bits numbered 16 to 19 are conducted directly from 0 to 19 bit output of ALU 303 to another input of register REG-1. In general, the lowest numbered bit is the most significant bit (MSB) and the highest numbered bit is the least significant bit (LSB) for any particular group of bits.

Decode and control 301 is equivalent to control 111 of FIG. 1, and is depicted as having multiple output paths. This is intended to mean that all components in FIG. 3A which are subject to control, receive their control signals from control 301. All control lines from block 301 to other blocks within P-P 102 are not shown, to improve clarity of presentation of FIG. 3A. The detailed control connections are shown in FIGS. 4-20.

Register file 302 comprises eight registers. Register REG-1 has two inputs, one being a 16-bit (0–15) input from multiplexer 308 and the other being a 4-bit (16–19) input from output of ALU 303. Output from register REG-1 is a 20-bit (0–19) binary word conducted to A input of ALU 303.

Register REG-2 likewise has a 16-bit input from multiplexer 308 and a 4-bit input from output of ALU 303. Similarly, there is a 20-bit output from register REG-2 to the A input of ALU 303.

Register FIRST FUNCTION REG-2 (F-1 REG-2) receives a 12-bit input from FIRST FUNCTION PROM (F-1 PROM) 305. Output of register FIRST FUNCTION REG-2 is a 12-bit binary word to the A input of ALU 303.

Finally, the fourth register associated with the A input of ALU 303 is register SECOND FUNCTION REG-2 (F-2 REG-2) which has a 12-bit binary word input from SECOND FUNCTION PROM (F-2 PROM) 306 and provides a 12-bit output to the A input of ALU 303.

Before proceeding with the B input to ALU 303, it should be noted that FIRST FUNCTION PROM 305 has a 10-bit (1–10) input from inverter 304; SECOND FUNCTION PROM 306 has a 10-bit (1–10) input from the output of inverter 304. Input to inverter 304 is 13 bits (0–12) derived from output of ALU 303.

Continuing then with the B input to ALU 303, register SECOND FUNCTION REG-1 (F-2 REG-1) receives a 12-bit binary word input from SECOND FUNCTION PROM 306 and provides a 12-bit binary word output to the B input of ALU 303. THIRD FUNCTION REG-1 (F-3 REG-1) receives a 12-bit input from THIRD FUNCTION PROM (F-3 PROM) 307 and provides a 12-bit output on the B input of ALU 303. Register REG-3 has a 12-bit (4–15) input from receiver 309 and provides a 15-bit output to the B input of ALU 303. Finally, register REG-4 has a 12-bit (4–15) input from receiver 309 and provides a 15-bit output to the B input of ALU 303.

With regard to register THIRD FUNCTION REG-1, its input which comes from THIRD FUNCTION PROM 307 is in turn derived from output of inverter 304. The input to THIRD FUNCTION PROM 307 is a 10-bit (3-12) binary word.

Prior to continuing with the remaining circuitry description consider the significance of the inputs to and outputs from PROMs 305, 306, 307 considered thus far. As noted earlier, PROM is an acronym for Programmable Read Only Memory, and is, therefore, a memory. Accordingly, input to this kind of memory, being a multi-bit binary word, can be conceived as a control store address word; it essentially points to a particular memory location within the PROM. Output from the PROM is content of that memory location, again in binary word form. Relationship of output of the PROM to input address to that PROM is determined by the mathematical function assigned to the PROM. For example, if one desires to have the square mathematical function performed on binary words then, if the word received by that function block is equivalent to decimal 10 (binary 1010) then the output of that particular functional block will be decimal 100 (binary 1100100). The reason for this result is that decimal 100 was stored in memory location decimal 10. In this manner, one can prepare a microstructure PROM to contain information desired to perform any mathematical function required to implement a particular algorithm.

Continuing with the circuitry description, in the upper left-hand portion of FIG. 3A, components 310-314 are shown. Output from ALU 303 is conducted to input of FOURTH FUNCTION PROM (F-4 PROM) 310. Bits 9-19 are indicated as the binary input which is equivalent to an 11-bit input word. Output from FOURTH FUNCTION PROM 310 is a 12-bit binary word, as B input to add-subtract register 312. The other input to add-subtract register 312 is provided on input A from M$\phi$ (or M0) register 311. This register provides a 16-bit A input to add-subtract register 312. M$\phi$ register 311 receives its 16-bit input from MEM-BUS by way of receiver 309. There is a dashed line input to add-subtract register 312 designated bit $\phi$, and is the zeroth bit from register REG-1 within register file 302. The purpose of this control bit will be discussed later. Output from add-subtract register 312 is conducted to register LA REG 313, the output of which by way of driver 314 is used as a 16-bit address word on LA BUS 108 to address main memory 103 of FIG. 1.

Returning to the output of ALU 303, the same bits (9-19) are conducted by way of buffer 315 to circuitry in the upper right portion of FIG. 3A, and initially to FIFTH FUNCTION PROM 316. A 12-bit output from PROM 316 is conducted to M3 register 319, a 16-bit output therefrom being provided to multiplier 320 as one input thereof. Receiver 325, connected from MEM-BUS 109, provides a 16-bit input from MEM-BUS to M1 register 317, M2 register 318, and M3 register 319. Output from register 318, a 16-bit binary word, is also an input to multiplier 320. Multiplier 320 has a 16 MSB and a 16 LSB output, both outputs directed to multiplexer (MUX) 323 and the MSB output also being provided to add block 321. M1 register 317 provides another 16-bit input to add block 321 which added together with the MSB output of multiplier 320 is conducted as an output of add 321 both back to register 317 and to MUX 323. The 16-bit output from MUX 323 is conducted by way of driver 324 to MEMBUS 109.

Finally, a carry output from add block 321 and a bit 0 output from multiplier 320, which are parallel processor originated signals, are provided to overflow detect logic located in interface 111' which in turn provides an external condition signal for the CPU.

Relative to the foregoing interconnection description, as noted, a single conductor line is intended to depict a plurality of parallel lines, each of which conducts a separate bit of information. And, where a particular single line branches to two lines, one branch line having a first number of bits, associated therewith and the other branch line having a lesser number, it should be understood that in at least one of the branches not all of the particular single line conductors are used. Decode and control block 301 has control lines directed to each of these component blocks and controls operation or functioning of those blocks, after decoding the microinstructions stored in the extension of the page two microprogram referred to above, and which will be described in more detail below. This completes the interconnection description of functional diagram FIG. 3A.

By way of introduction to FIGS. 4-20, inputs appear generally on left-hand sides of components and outputs appear on right-hand sides therefrom. Control lines generally appear at tops and bottoms of components. An output line labeled with a particular designation is intended to be interpreted as connected to an input line having the same designation. Each interconnection is not described verbally for clarity of purposes of illustration, and full meaning and understanding of the invention will be better achieved by referring to the appended drawings wherein the line labelings clearly shown the connections. Furthermore, most figures include at least one numerical designation in the "300" series, keying that figure to its respective components, if any, in FIG. 3A. Finally, each component is designated by a particular "U" unit number.

Figure 4A:
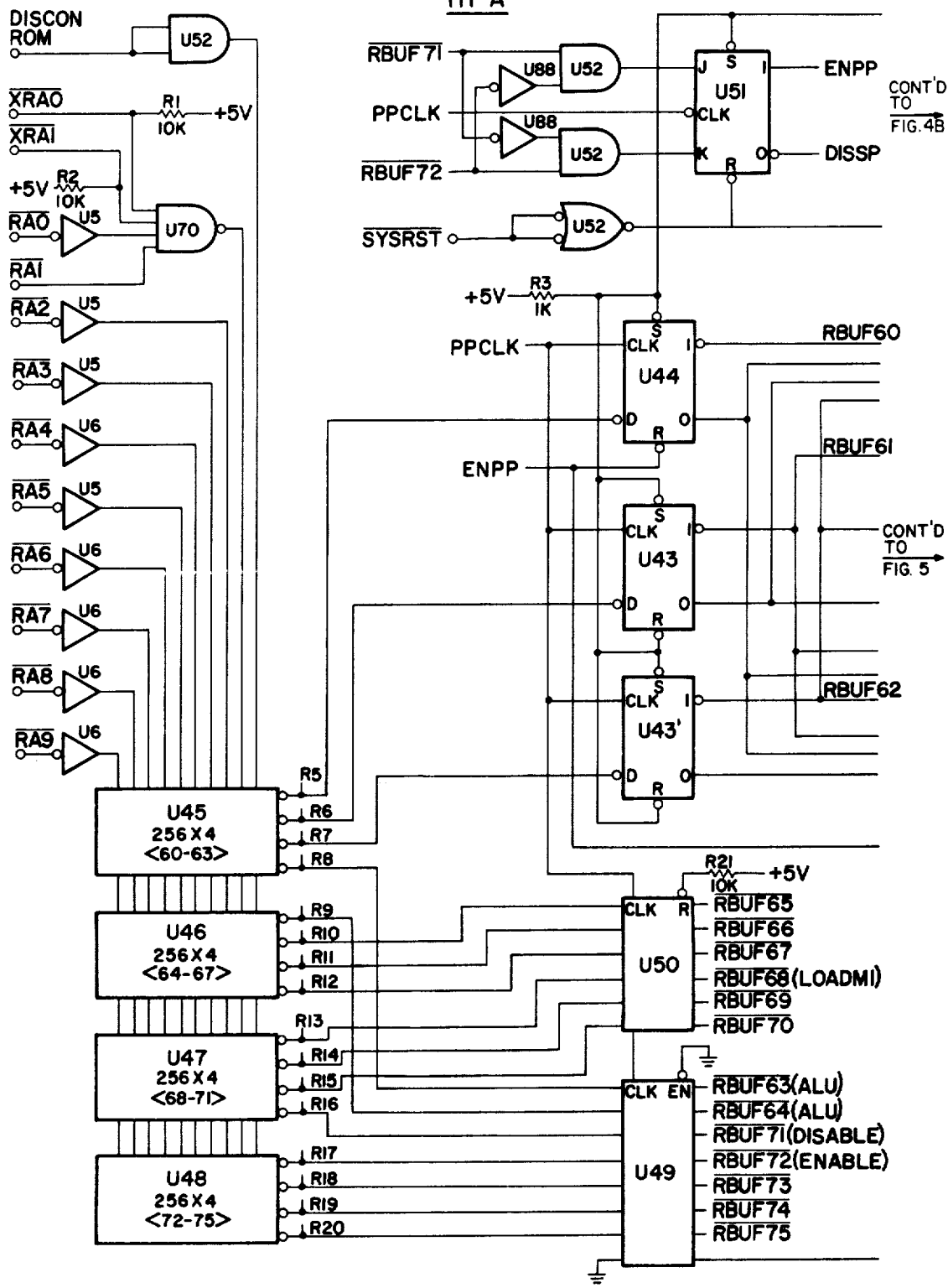
FIGS. 4A and 4B are circuit diagrams of some of the circuitry employed within the interface structure of FIG. 1.
Figures 4B, 5:
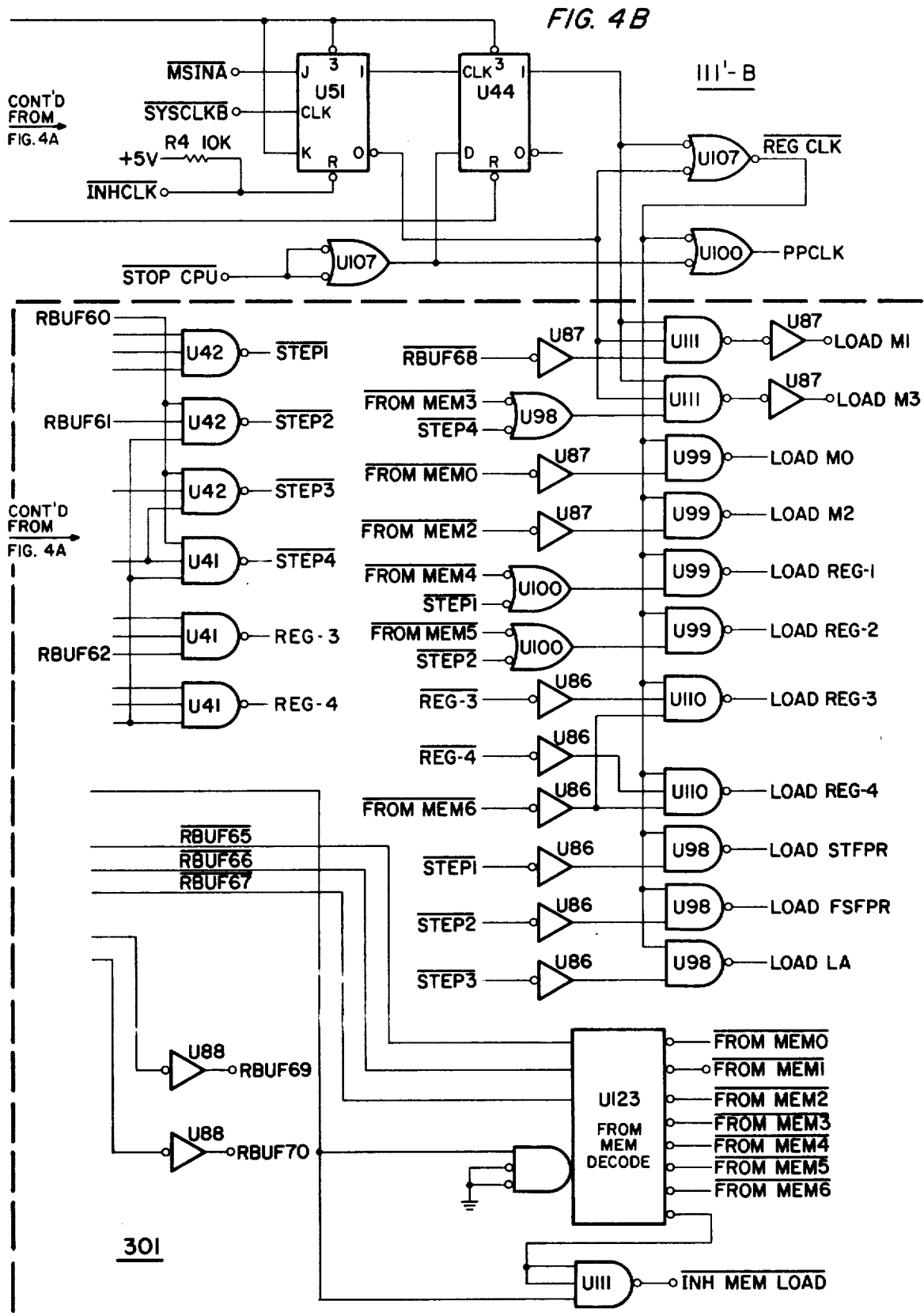
FIG. 5 is a circuit diagram of circuitry included within decode and control 301.

FIGS. 4A and 4B

Circuitry shown in FIGS. 4A and 4B is part of the circuitry contained within interface block 111' of FIG. 1. In FIG. 4A, four extended control store PROMS are designated U45, U46, U47 and U48. Each of these PROMs is 256 bits long and 4 bits wide and taken together are arranged to store 256 16-bit words. Outputs of the four PROMs are connected to an appropriate supply voltage via resistors R5-R20 (resistors not shown to improve clarity of presentation in this and certain succeeding figures).

These PROMs are controlled by the CPU via the $\overline{RA}$ lines as shown. $\overline{RA0}$ through $\overline{RA9}$ comprise 10 lines; two other lines $\overline{XRA0}$ and $\overline{XRA1}$, and another line DISCON ROM, are also control lines for these four PROMs. These are examples of CPU-originated signals. PROMs U45-U48 in combination form an extended 256 words of micromemory, 16 bits per word. In the preferred embodiment, page two is selected to have this control store extension to control PP 102. However, it should be understood that more than four pages can be used within the CPU; lines $\overline{XRA0}$, $\overline{XRA1}$, $\overline{RA0}$, and $\overline{RA1}$ together can specify one of 16 pages, although only four pages are presently used.

When page two is selected by the CPU control, signals $\overline{XRA0}$, $\overline{XRA1}$, $\overline{RA0}$ and $\overline{RA1}$ each have a particular true or false condition. For that unique set of conditions where CPU control 110 selected page two, gate U70 enables these four PROMs subject to control by gate U52. The signal DISCON ROM, via gate U52, inhibits all four PROMs if this signal becomes true, or goes high. Thus, for P-P 102 to be operative, page two must be selected by the CPU, enabling gate U70, and DISCON ROM signal must be low. For this circumstance, lines $\overline{RA2}$ through $\overline{RA9}$ (8 bits) will select one microinstruction out of 256 16-bit words from this extended portion (U45-U48) of page two of the CPU's microcode, and this output is stored in buffer circuitry (to be described) within FIG. 4A, (Eight bits are needed to address one out of 256 words, since $2^8 = 256$; nine bits for 512 words, 10 bits for 1024, etc.).

Flip-flops designated U43', U43, and U44 and registers U49 and U50 together comprise a buffer or register which can be referred to as RBUF. Outputs from PROM U45-U48 are conducted to this register, which can hold bits RBUF 60 through RBUF 75, these 16 bits thus representing interface signals. The three most significant bits, bits 60, 61 and 62 are stored respectively in flip-flops U44, U43, and U43'. Other bits are stored in D-type flip-flops labeled U50 and U49 as shown. Contents of this 16-bit RBUF register represent one control word, and, after decoding in block 301, is used to control operation of the remaining portion of PP, as later described in more detail.

FIG. 4B shows circuitry within interface 111' which is responsible for clock generation for use by the PP. PP clock is generated from the signals $\overline{\text{SYS-CLK B}}$, $\overline{\text{MS INA}}$, $\overline{\text{INH CLK}}$, and $\overline{\text{STOP CPU}}$, which as noted earlier are signals from the CPU. PP clock is functionally identical to CPU clock and is therefore synchronized therewith. PP CLK is the signal which loads the output of PROMs U45-U48 into the RBUF register within FIG. 4A and performs other timing functions. Other timing signals, $\overline{\text{REG CLK}}$, are also generated by this interface circuitry and these signals are used to individually load certain registers as indicated in FIG. 5, yet to be discussed.

FIG. 5

FIG. 5 contains circuitry which receives signals from the RBUF register of FIG. 4A and decodes them to generate logical signals which, in turn are used to load registers in, and control operation of, the PP, as later described in more detail. Additionally, there is circuitry which decodes RBUF 65 through RBUF 67 and generates $\overline{\text{FROM MEM}}$ signals which control flow of data from the MEMBUS to several registers. Output signals $\overline{\text{FROM MEM}}$ in FIG. 5 are used as inputs within FIG. 5, as can be seen. Also, FIG. 5 shows a signal called $\overline{\text{INH MEM LOAD}}$ which is conducted to CPU 101 under certain conditions to be described. The various LOAD signals depicted in FIG. 5, are examples of parallel processor command signals.

FIGS. 9 AND 10

Figure 9:
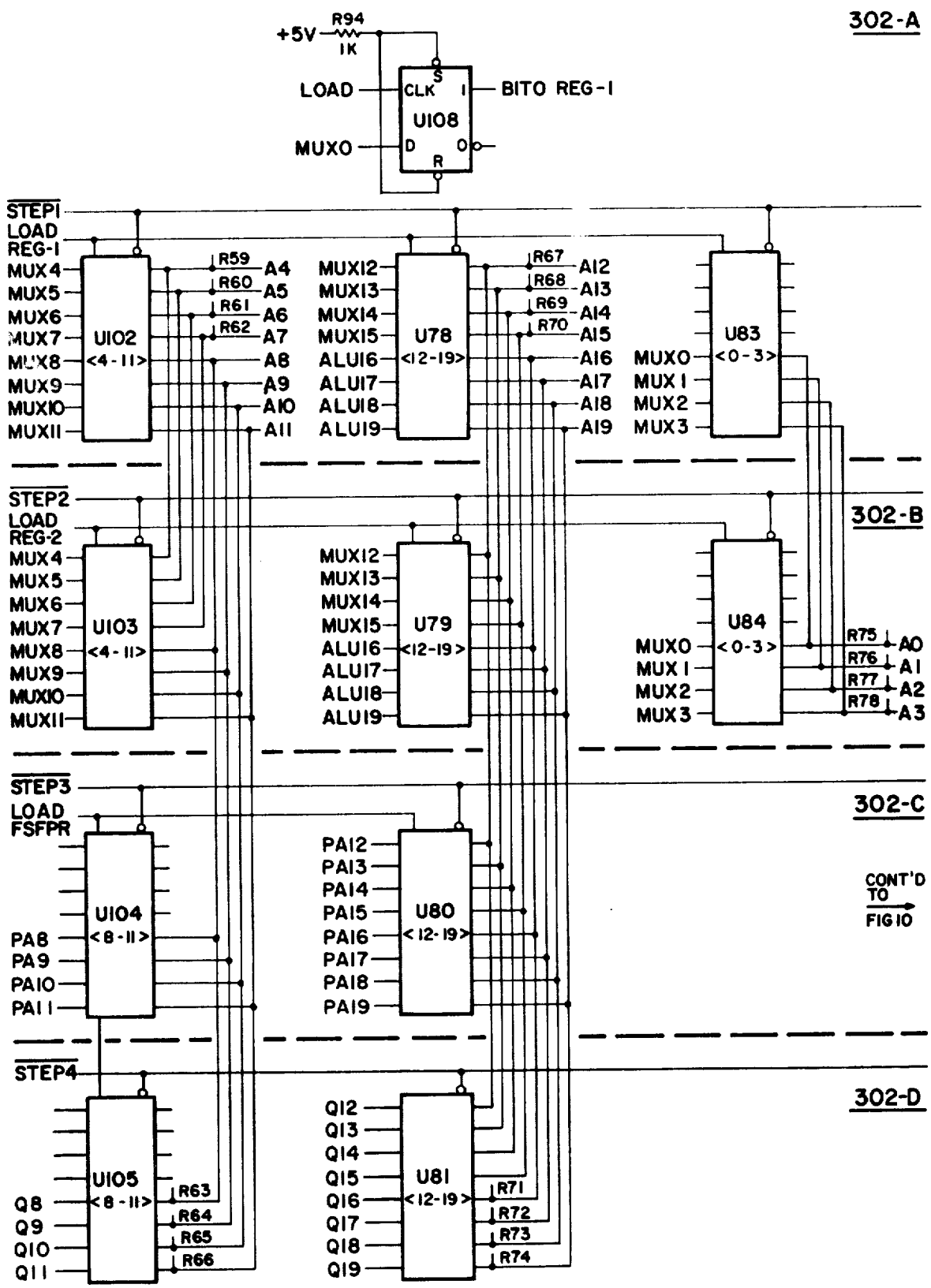
FIGS. 9 and 10 are circuit diagrams of circuitry within registers 302.
Figure 10:
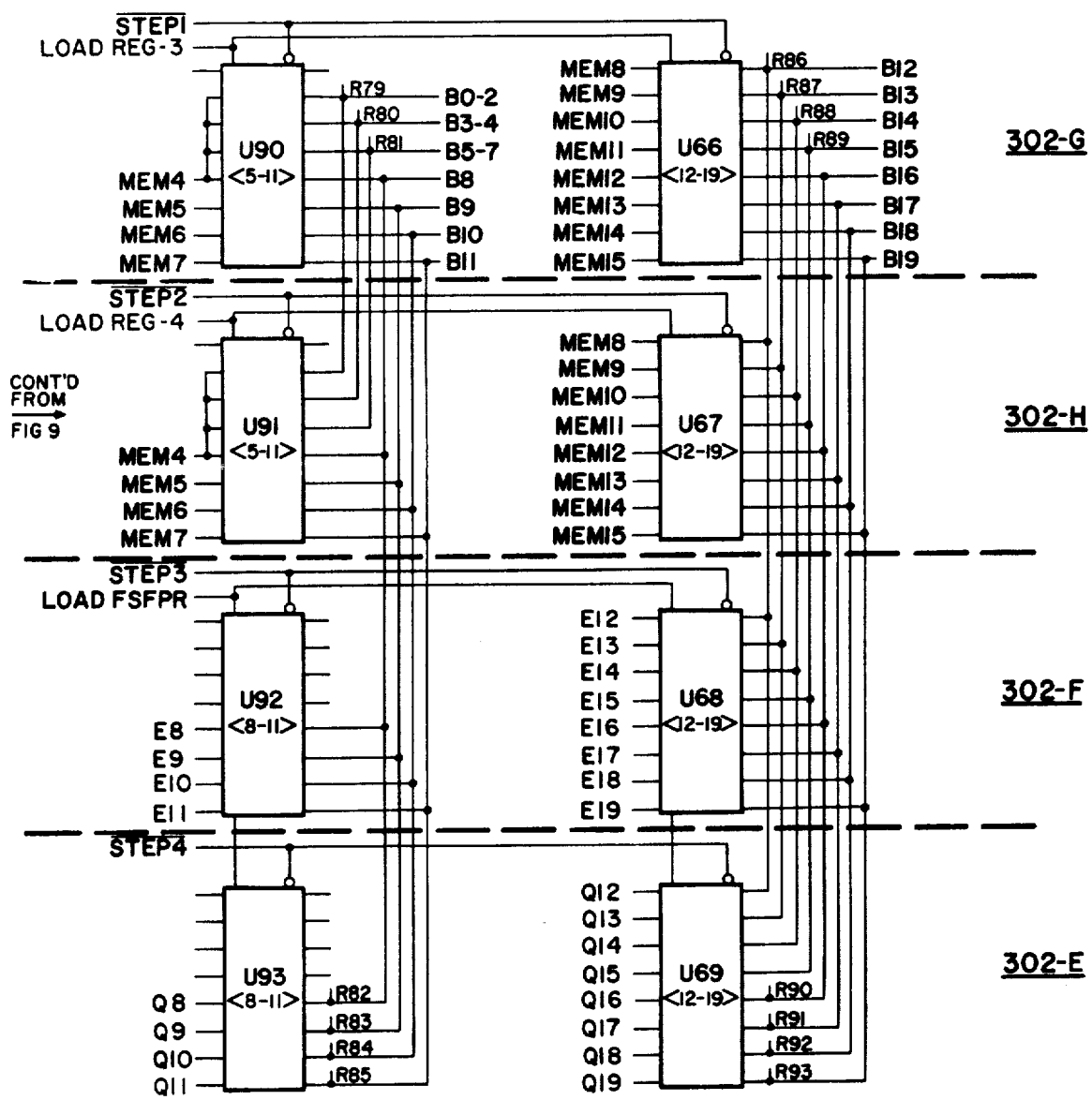

Referring next to FIG. 9 and FIG. 10, there are eight sections shown, 302-A through 302-H. Each section corresponds to one of the registers in the register file 302 of FIG. A. Section 302-A contains circuitry comprising D-type flip-flops designated U83, U108, U102, and U78, and these flip-flops correspond to register REG-1. Section 302-B of FIG. 9 includes D-type flip-flops U84, U79 and U103, and these flip-flops correspond to register REG-2. Section 302-C contains D-type flip-flops U80 and U104 which correspond to F-1 REG-2. Section 302-D includes two D-type flip-flops U81 and U105 which correspond to F-2 REG-2. Section 302-E contains D-type flip-flops U69, U93 which correspond to F-2 REG-1. Section 302-F contains two D-type flip-flops U68, U92 which correspond to F-3 REG-1. Section 302-G contains two D-type flip-flops U66, U90 which correspond to REG-3. And, finally, section 302-H contains two D-type flip-flops U67, U91 which correspond to REG-4.

Digressing momentarily, the eight registers of register file 302 are arranged in two groups of four registers each. The four registers in the left group are designated REG-1, REG-2, F-1 REG-2, and F-2 REG-2. Outputs of these four registers are tied together in a tri-state bus and this output is the A input to ALU block 303. The right-hand group of four registers are designated F-2 REG-1, F-3 REG-1, REG-3, and REG-4. Outputs of these right-hand four registers are also tied together in a tri-state bus which provides input B to ALU 303.

Designations of these eight registers indicate that they can be adapted to many uses; they are generically labeled. For example, if register REG-1 contains a binary word representative of a predetermined parameter, then THIRD FUNCTION REG-1 temporarily stores a value which is some predetermined function of the value in register REG-1, and determined by THIRD FUNCTION PROM 307. This PROM is addressed by the binary value stored in register REG-1, and output from this PROM is the value of the function corresponding to its address. SECOND FUNCTION PROM 306 performs a function (different from the operation or function performed by PROM 307) on the binary word from SECOND FUNCTION REG-1, which corresponds to the address of PROM 306. These functions can be virtually any mathematical function or operation.

Returning to FIG. 9, REG-1 is loaded from the output of multiplexer 308 and ALU 303. Inputs MUX 0-MUX 15 and inputs ALU 16-ALU 19 are shown. Register REG-2, section 302-B, has inputs MUX 0-MUX 15 and ALU 16-ALU 19 similar to REG-1 above. Register FIRST FUNCTION REG-2, section 302-C, has inputs PA 8-PA 19 representing inputs from FIRST FUNCTION PROM 305. Finally, register SECOND FUNCTION REG-2, section 302-D, has inputs Q 8-Q 19 representing inputs from SECOND FUNCTION PROM 306. Outputs of these four registers are tied into ALU inputs A0-A19, this being the tri-state bus earlier mentioned as input A to ALU 303.

Continuing in a similar way with FIG. 10, SECOND FUNCTION REG-1 (section 302-E) has inputs Q 8-Q 19 from PROM 306; THIRD FUNCTION REG-1 (section 302-F) has inputs E 8-E 19 from PROM 307; REG-3 (section 302-G) has inputs MEM4-MEM15 from MEMBUS 109 by way of receiver 309; and REG-4 (section 302-H) has inputs from MEM4-MEM15 likewise from receiver 309. Again, outputs of these four registers are tied together in a tri-state bus, labeled B0-B19, and form B input to ALU 303.

As noted earlier control signals from block 301 are shown applied at the top of components. In FIG. 9, REG-1 is controlled by $\overline{\text{STEP 1}}$ and LOAD REG-1 signals; REG-2 is controlled by $\overline{\text{STEP 2}}$ and LOAD REG-2 signals; PROM 305 is controlled by $\overline{\text{STEP 3}}$ and LOAD FSFPR (First and Second Function PRom) signals; and PROM 306 is controlled by $\overline{\text{STEP 4}}$ and FSFPR signals. The control signal FSFPR is simultaneously applied to U104 and U105 as well as U80 and U81 (since vertical control lines extending from component to component are intended to represent this component interconnection throughout). In FIG. 10, a similar control signal description applies.

FIG. 6

Figure 6:
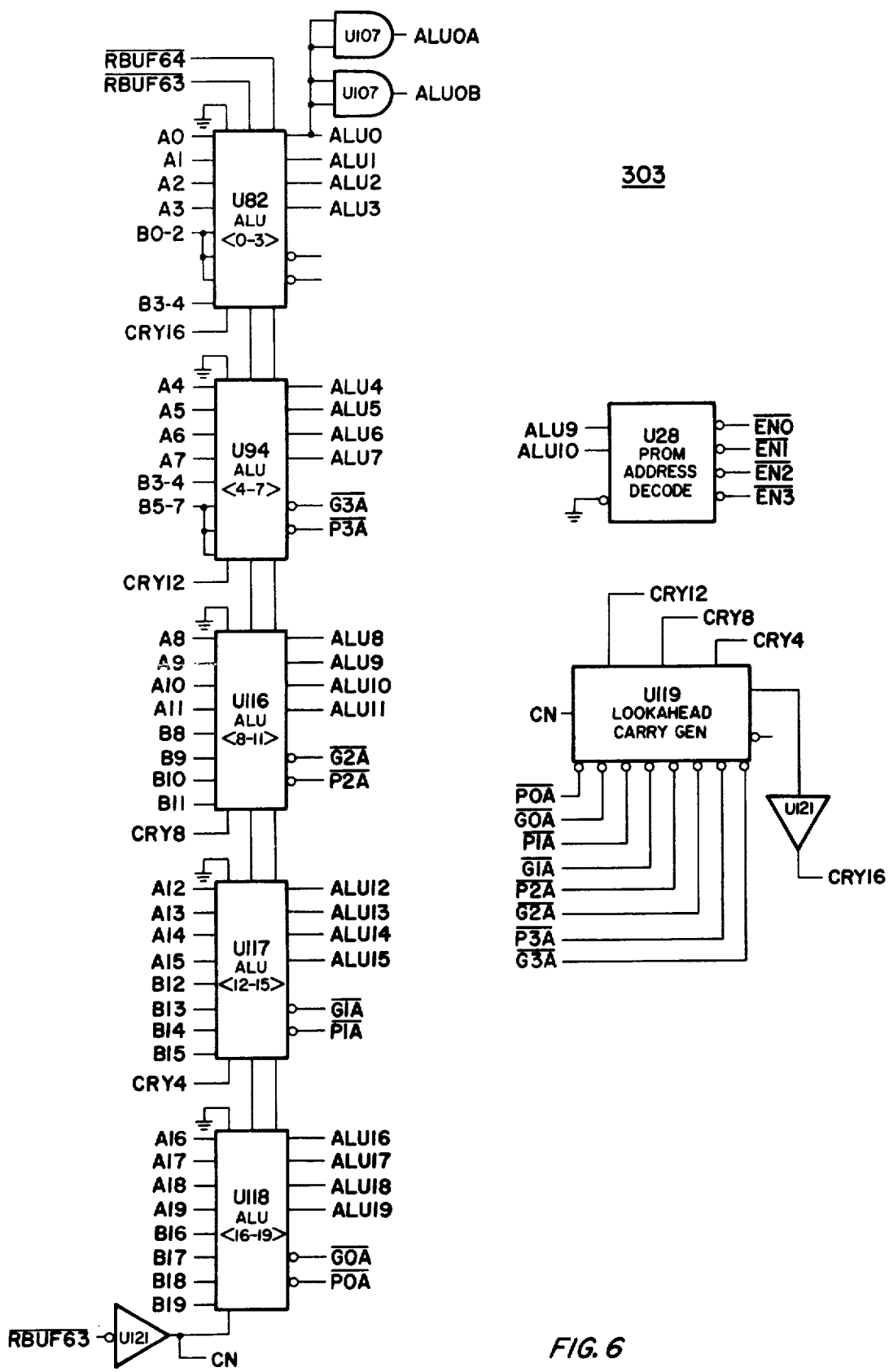
FIG. 6 is a circuit diagram of circuitry included within ALU 303.

Next, referring to FIG. 6, ALU 303 is shown in section 303 and is a 20-bit ALU comprising five integrated circuits each of which is a four bit arithmetic and logic unit. The integrated circuits are designated U82, U94, U116, U117 and U118. U119 is another integrated circuit which performs a look-ahead fast function. Signal inputs to the five integrated circuits are either A or B inputs as earlier noted. Signals $\overline{\text{RBUF-63}}$, $\overline{\text{RBUF-64}}$ from FIG. 4A and signals CRY 4, 8, 12 and 16 from look-ahead U119 in FIG. 6 are used to control this operation. ALU 303 performs one of four functions responsive to the control signals: either A and B, A minus B, B minus A, or zero. The 20-bit output designated ALU 0-ALU 19 is employed in different groupings and indicated in FIG. 3A. Integrated circuit U28 receives ALU 9 and ALU 10 signal inputs and provides $\overline{\text{EN0-EN3}}$ signal outputs representative thereof.

FIG. 8

Figure 8:
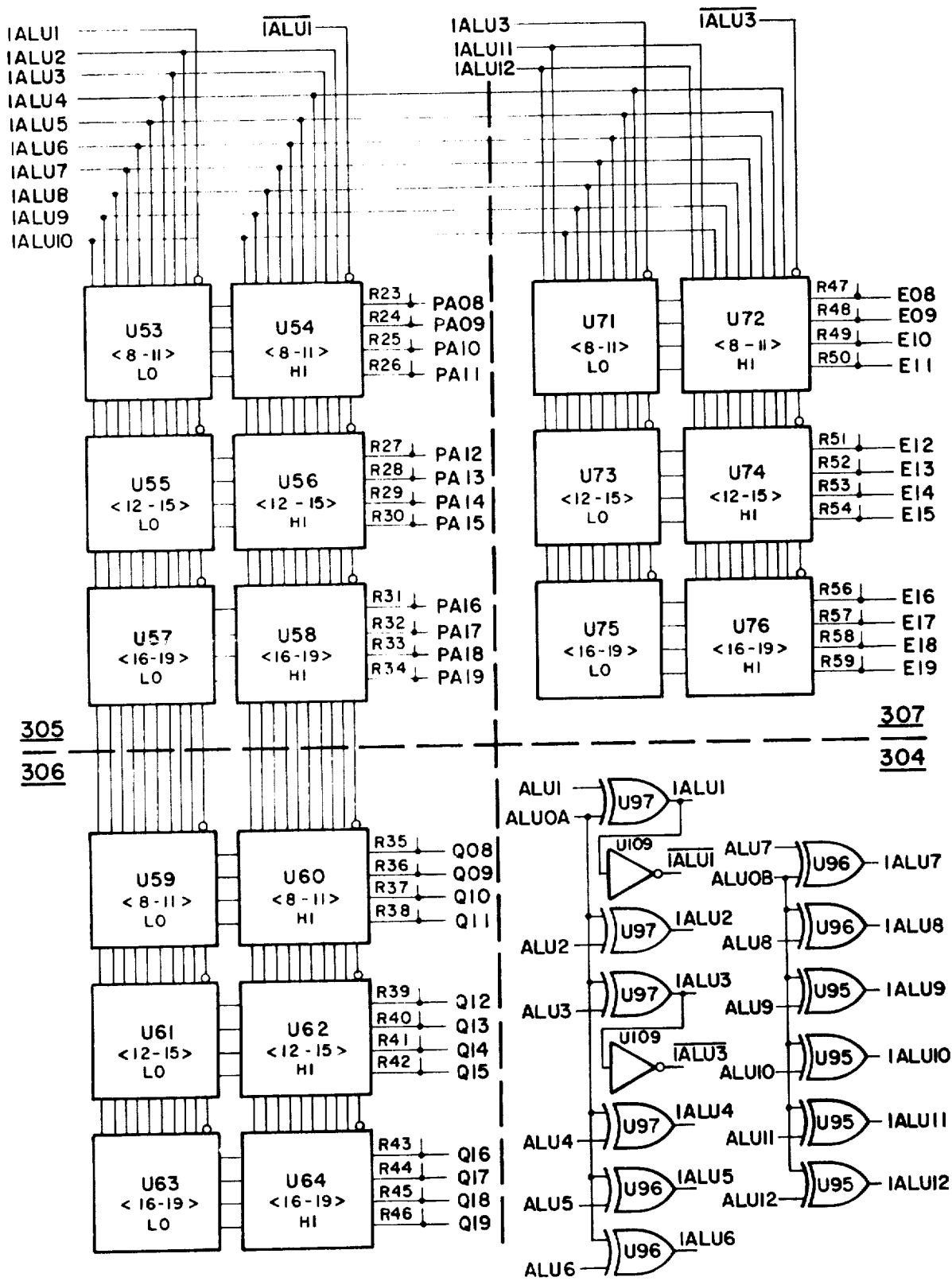
FIG. 8 is a circuit diagram of circuitry included within inverter 304, and PROMs 305, 306, and 307.

Next, referring to FIG. 8 which includes sections 304, 305, 306, and 307, inverter 304 inverts input bits 0-12 if ALU output bit 0 is equal to a 1. This is accomplished by employing exclusive OR logic. ALU 0 output is conducted to one input of each exclusive OR GATES 95, 96, 97. Referring back to FIG. 6, section 303, ALU 0 output goes to two buffer gates designated U107, outputs therefrom designated ALU 0A and ALU 0B. Thus, in FIG. 8, section 304, the ALU 0A and ALU 0B designations are used. When this common input of exclusive ORs 95, 96, 97 is high, output of each exclusive OR gate is logically the complement of the other input; when this common input is low, output of each exclusive OR gate is logically the same as the other input.

PROM 305 is comprised of six individual IC's (U55-U58 inclusive) each being a 512-word by 4-bit per word capacity PROM together forming a 1K (1024 word) by 12-bit PROM. From consideration of binary arithmetic, one can determine that any 1K word by 12-bit PROM requires 10 input bits to address it. The 10-input bits that address PROM 305 are IALU 1-IALU 10 from inverter 304. The 12-bit output which appears at the right-hand portion of integrated circuits U53-U58 is designated PA 8-PA 19. This output is conducted from FIRST FUNCTION PROM 305 to FIRST FUNCTION REGISTER REG-2.

Similar remarks can be made for SECOND FUNCTION PROM 306, comprised of IC's U59-U64 inclusive, which is likewise addressed by the same IALU 1-10 bits and whose output is designated Q 8-Q 19. This output is of course conducted to SECOND FUNCTION REGISTER REG-2 and SECOND FUNCTION REGISTER REG-1.

Finally THIRD FUNCTION PROM 307 is comprised of integrated circuits U71-U76. Again, this is a 1K by 12-bit PROM requiring 10 address bits; these bits are not the same as those used in PROMs 305 and 306; herein bits IALU 3-12 are used. Output from PROM 307 is conducted to THIRD FUNCTION REG-1.

FIG. 11

Figure 11:
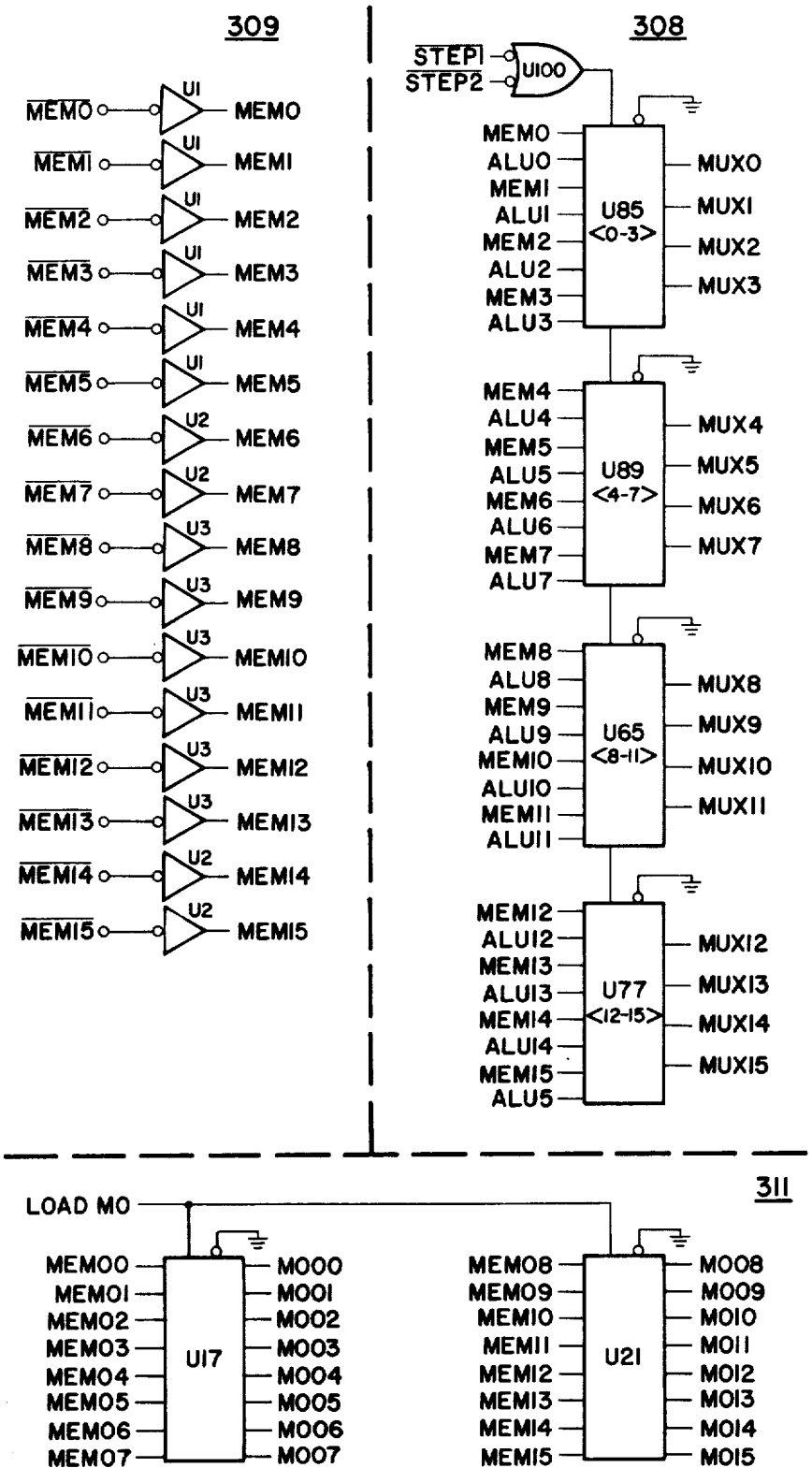
FIG. 11 includes circuit diagrams of circuitry contained within multiplexer (MUX) 308, receiver 309, and register 311.

Referring to FIG. 11, which includes schematic circuitry of MUX 308, receiver 309, and M0 register 311, multiplexer 308 is a 16 input 2 to 1 multiplexer comprising integrated circuits U85, U89, U65, and U77. Inputs to this multiplexer and MEM0-MEM15 or selectively ALU0 to ALU15, and outputs are labeled MUX0--MUX15. Inputs are thus either output of ALU 303 or data from MEMBUS. This multiplexer is controlled by signals $\overline{\text{STEP 1}}$ and $\overline{\text{STEP 2}}$.

Receiver 309, an inverter comprising ICs U1, U2, U3, inverts the 16 signals $\overline{\text{MEM0-MEM15}}$ from MEMBUS as indicated in FIG. 11, and supplies the signals $\overline{\text{MEM0-MEM15}}$ to MUX 308, above, and to register 311.

M0 register 311 receives its signal input ultimately from MEMBUS via inverter 309, signals being designated MEM0-MEM15. It is constructed from D-type flip-flops U17 and U21, and is controlled by signals LOAD M0. Output M00-M015 from register 311 is conducted to add-subtract block 312 as A input thereof.

FIG. 7

Figure 7:
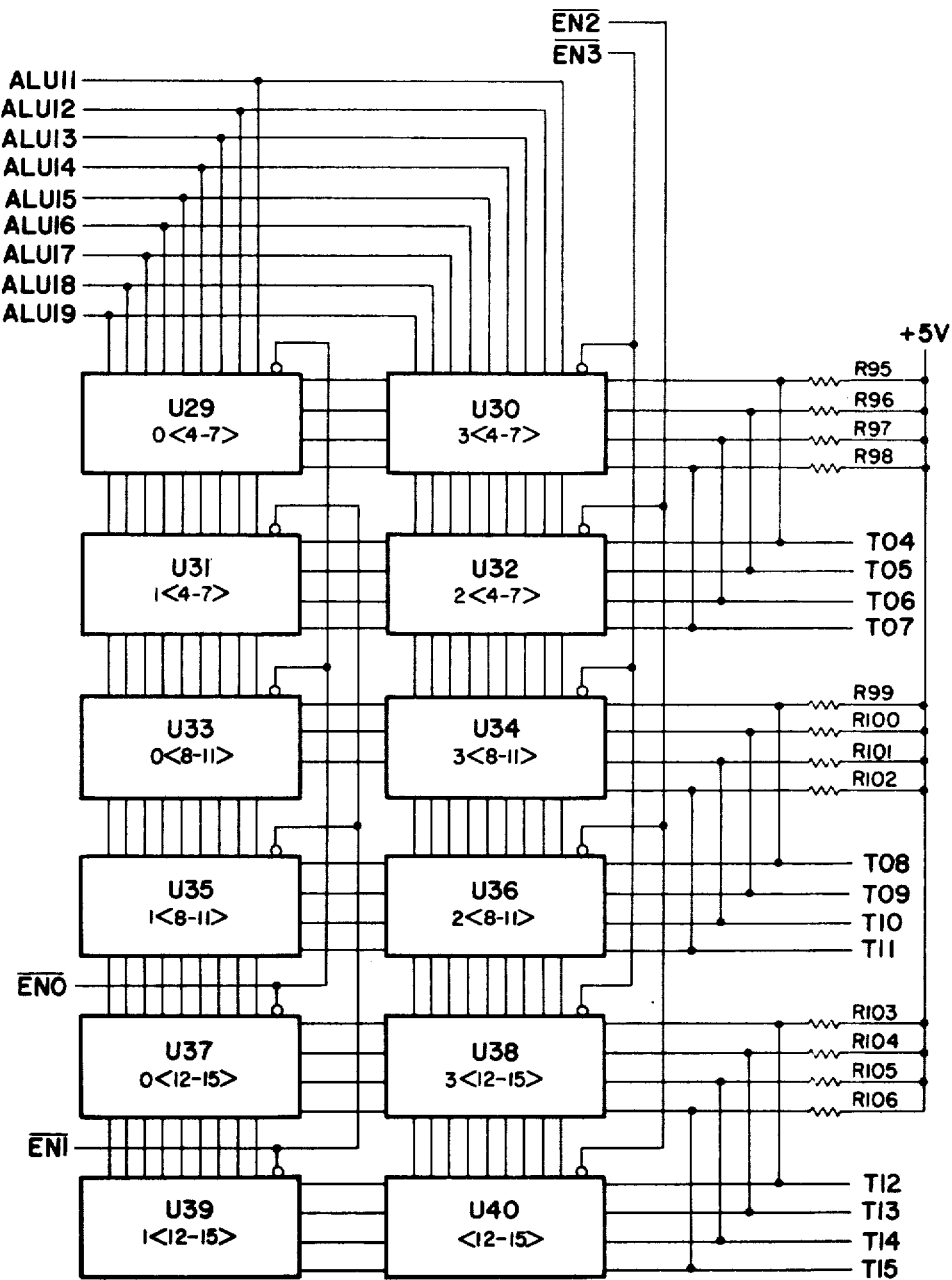
FIG. 7 is a circuit diagram of circuitry included within PROM 310.

FOURTH FUNCTION PROM 310 shown in FIG. 7 provides the other input to add-subtract block 312, as input B thereof. This PROM is constructed from 12 integrated circuits designated U29-U40 inclusive. It is connected to a 5 volt supply through resistors R95-R106 inclusive. Its inputs are signals ALU 11-ALU 19, and signals $\overline{\text{EN0-EN3}}$ inclusive (the latter four signals being representations of ALU 9 and ALU 10) all derived from ALU 303 in FIG. 6. Its outputs are designated T4-T15, inclusive. Thus, PROM 310 is essentially addressed by 11 bits ALU 9-ALU 19. Since total size of this PROM is 2K words by 12 bits per word, it is necessary to address this PROM with 11 bits.

FIG. 12

Figure 12:
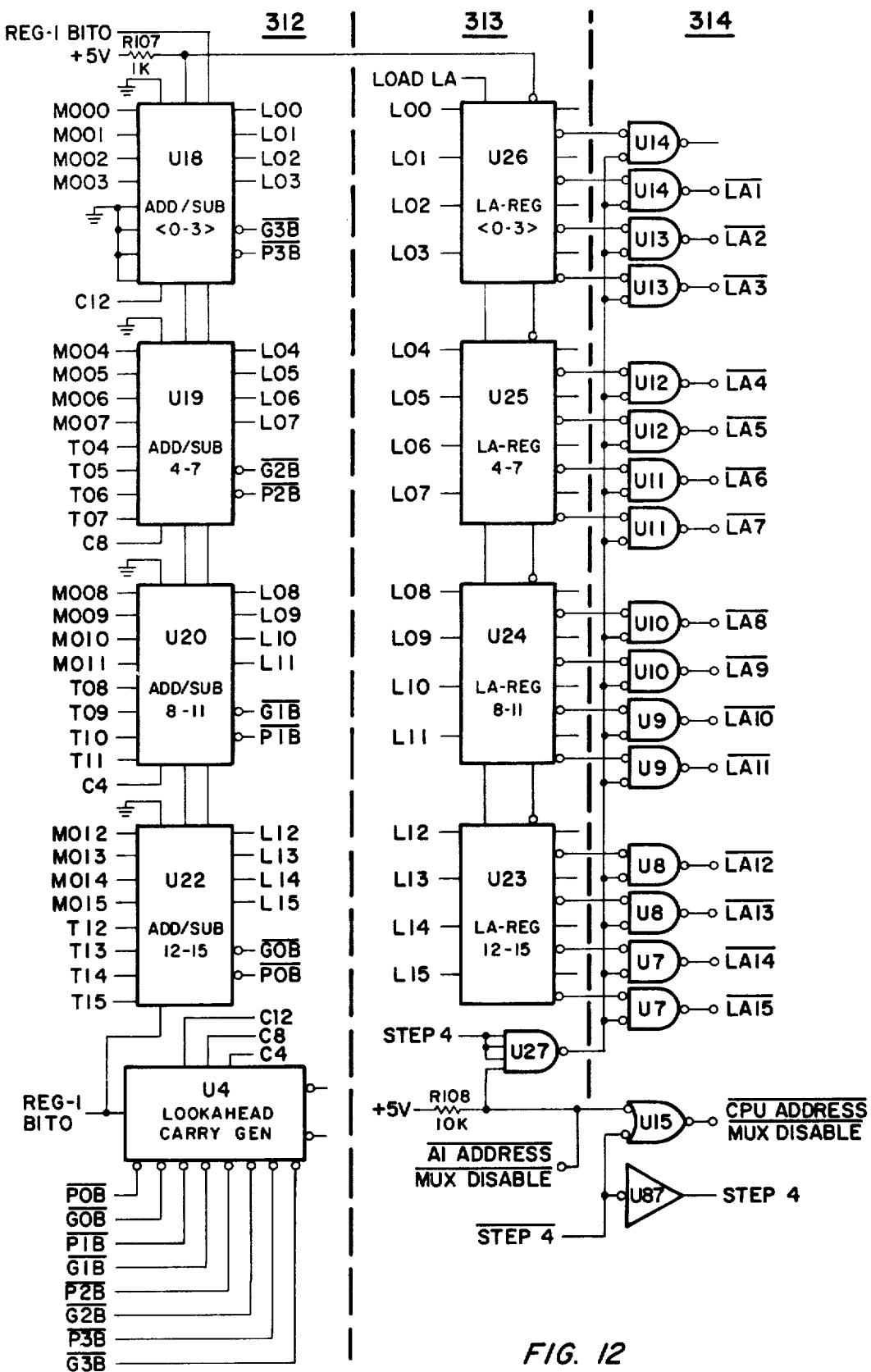
FIG. 12 is a circuit diagram of circuitry within registers 312 and 313 and driver 314.

Referring to FIG. 12, section 312 contains detailed circuitry within add-subtract block 312 comprised of four integrated circuits U18-U22 inclusive which receive input signals from M0 register and FOURTH FUNCTION PROM 310. A control signal, designated BIT 0, is derived from the zeroth bit of register REG-1. If this control bit is a 1, output of add-substract 312 will be input B minus input A; otherwise output of block 312 is input B plus input A. Circuit U4 within section 312 is a fast look-ahead carry generator and is used to quicken operation of add-subtract block 312. Look-ahead generator U4 outputs C4, C8, and C12 are directed respectively to U20, U19 and U18 for this purpose. U4 inputs are of course derived from $\overline{P}$ and $\overline{G}$ outputs of U18-U22 as designated.

Section 313 within FIG. 12 is a schematic representation of LA register 313 comprising ICs U23-U26 inclusive and which receives L0-L15 signal inputs directly from section 312 as designated controlled by LOAD LA. Output of register 313 goes to drivers U7-U14 inclusive in section 314 as shown, outputs therefrom designated $\overline{\text{LA1-LA15}}$ and being conducted to LA BUS 108.

FIG. 13

Figure 13:
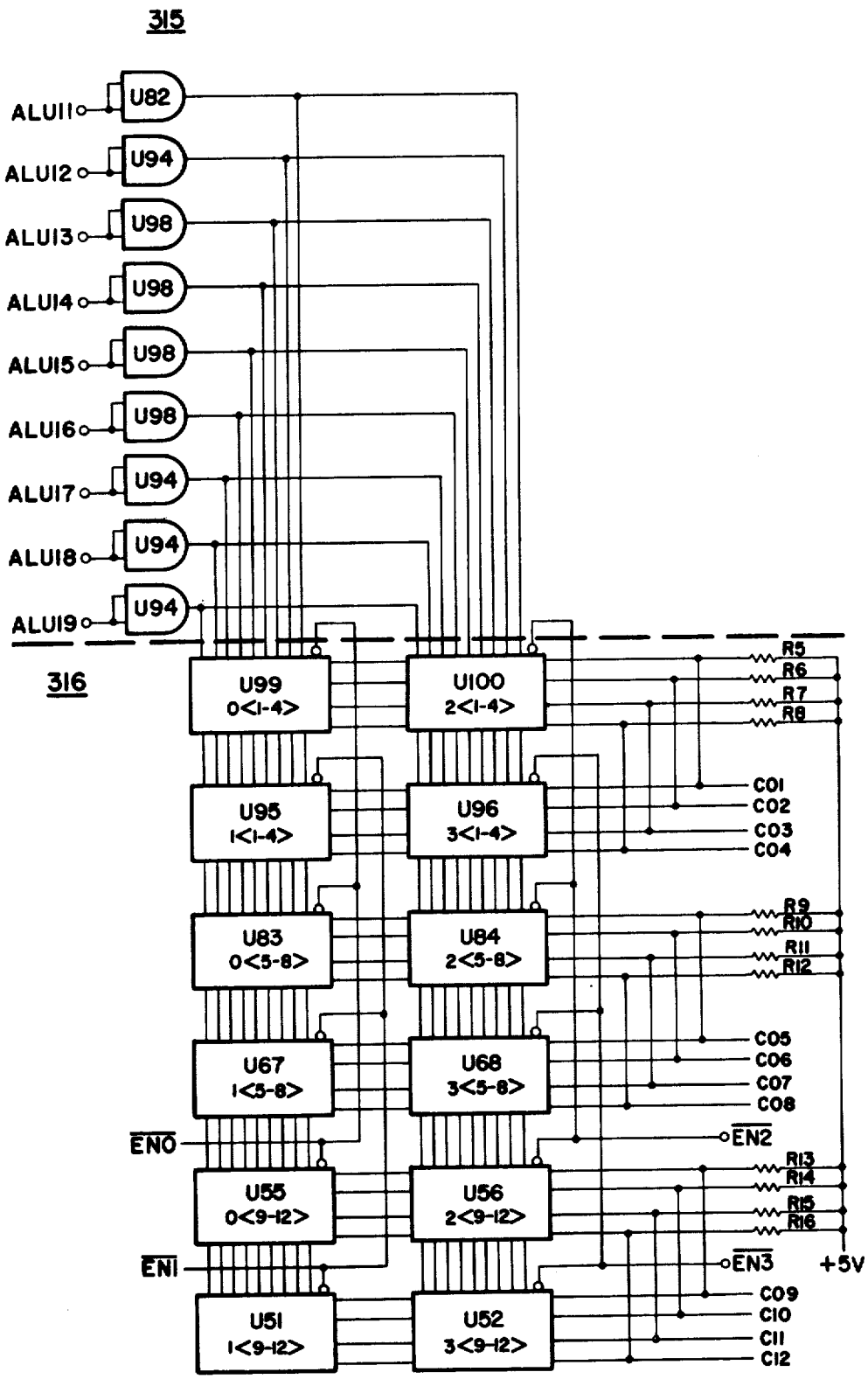
FIG. 13 includes circuit diagrams of circuitry within buffer 315 and PROM 316.

Continuing this component interconnection description and moving to the right-hand portion of FIG. 3A, buffer 315 is shown in FIG. 13, section 315 thereof. ALU output ALU 11-ALU 19 inclusive is received by buffer elements U82, U94, U98 as shown which provides more drive as required. Signals ALU 11 through ALU 19 are conducted into FIFTH FUNCTION PROM 316 as shown in FIG. 13, this PROM being constructed from 12 512-word by 4 bit PROMs providing a 2K word by 12 bit PROM, thus requiring an 11 bit address. It is connected to a 5 volt supply through resistors R5-R16 inclusive. Signals $\overline{\text{EN0-EN3}}$ inclusive, derived from signals ALU 9 and ALU 10, are conducted to this PROM as address bits and thus in combination with ALU 11–ALU 19 provide the 11 address bits required. Outputs are designated C 1–C 12 inclusive, which are conducted to M3 register 319.

FIG. 14

Figure 14:
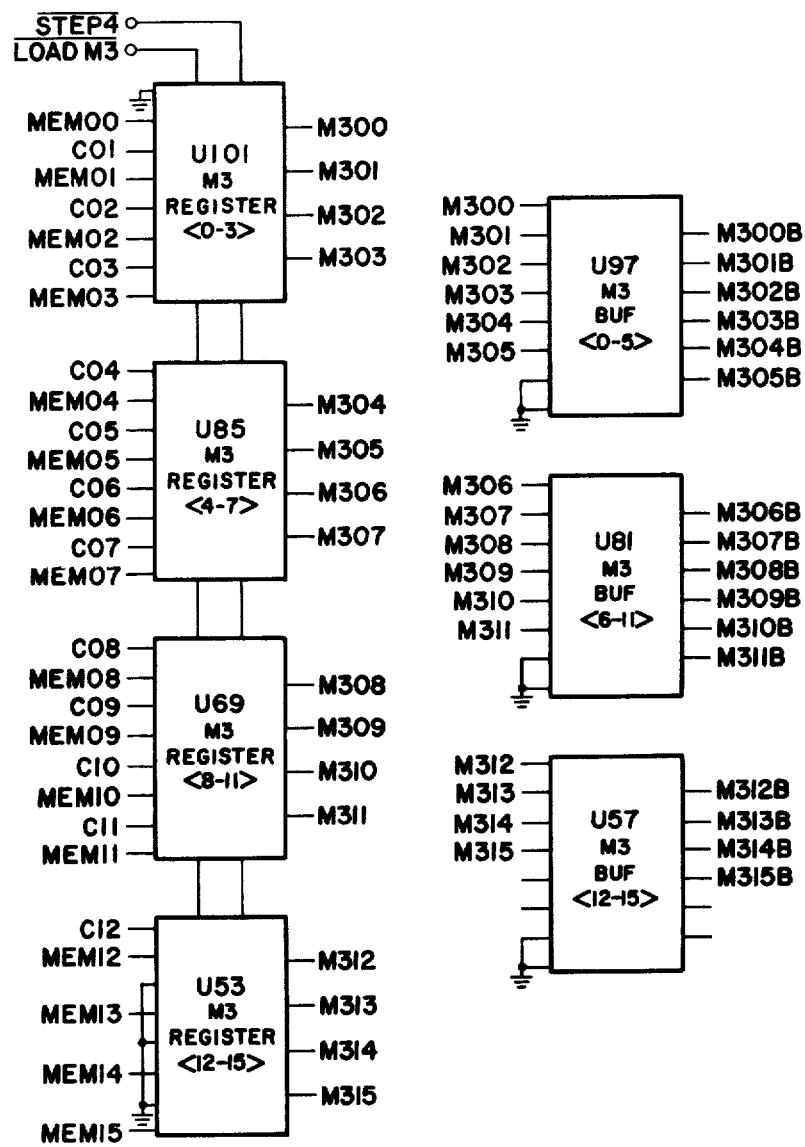
FIG. 14 is a circuit diagram of circuitry within register 319.

M3 register 319 is shown in FIG. 14 having inputs C 1–C 12 (or C 01–C 12) and other inputs from MEMBUS, MEM0-MEM15. U101, U85, U69, and U53 comprise an entry register, a D-type register with 2 to 1 multiplexing. Its output M30-M315 is conducted to another portion of register 319, for driving purposes. U97, U81, and U57 are driver circuits for entry output signals.

FIGS. 17 to 20 (in part)

Figure 19:
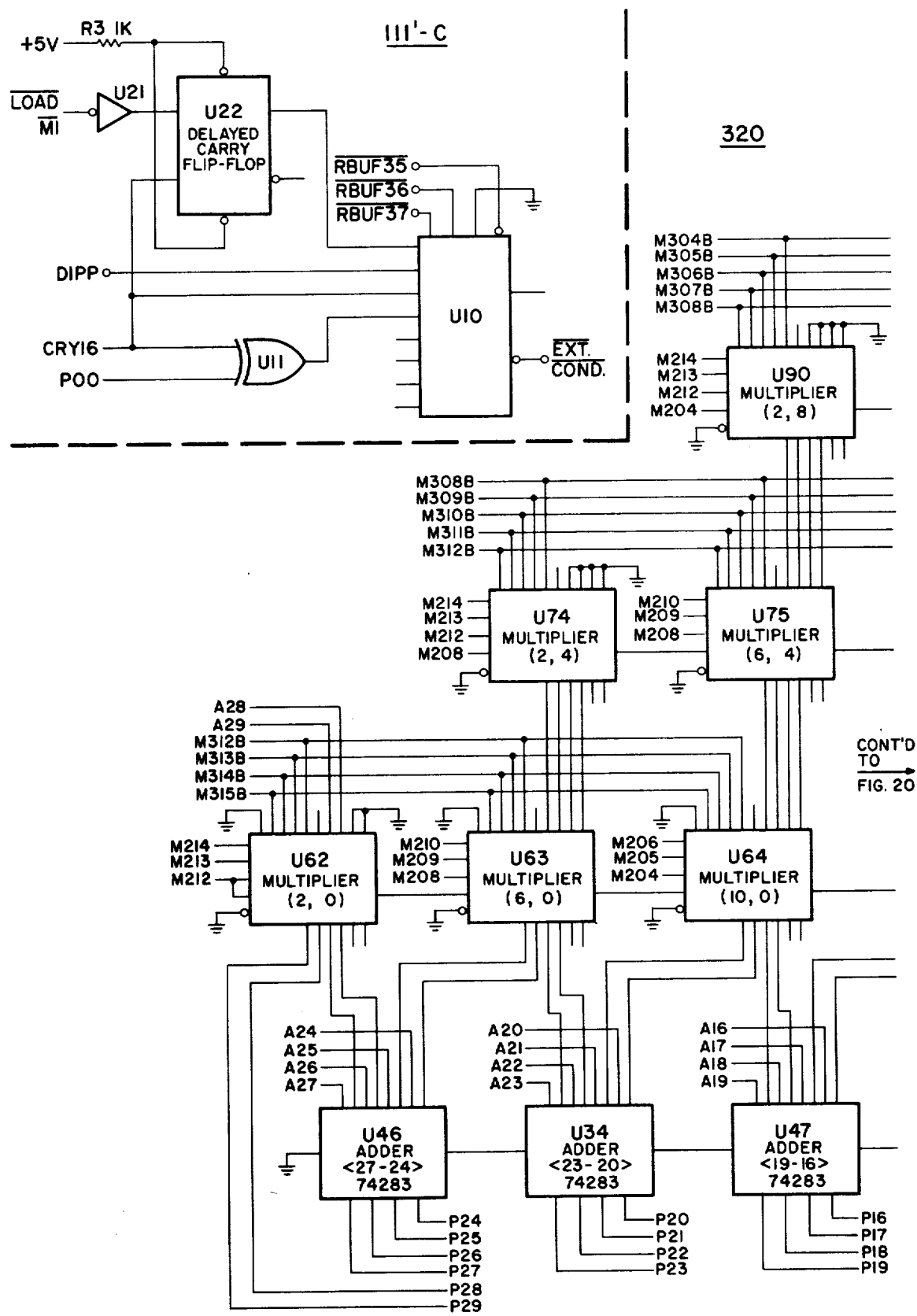
FIGS. 19 and 20 include circuit diagrams of circuitry within multiplier 320 and within the interface's overflow detector 111'-C.
Figure 20:
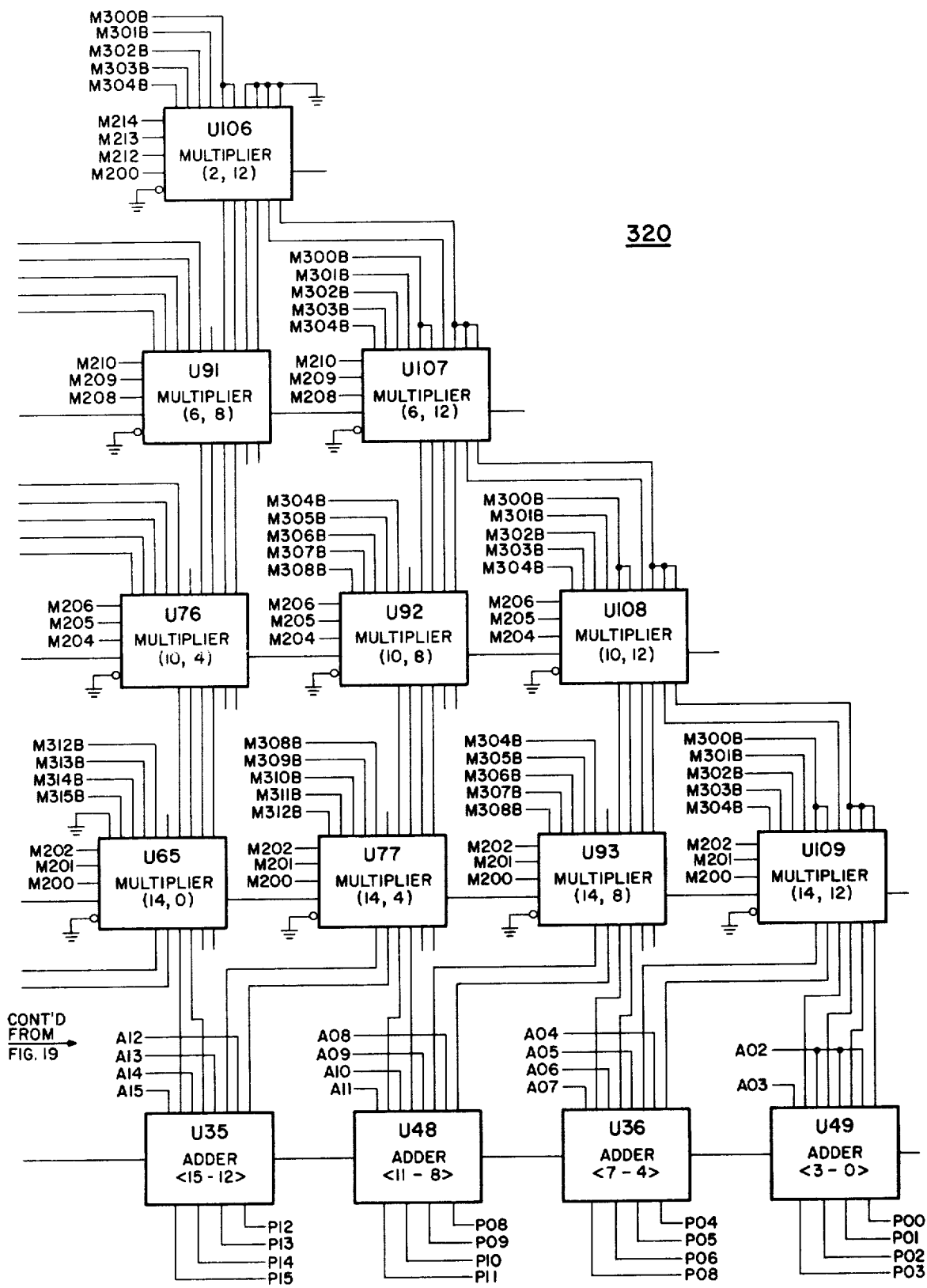

Output of M3 register 319 is one of the two inputs to signed multiplier 320. Referring to FIGS. 17–20, signed multiplier 320 is shown in schematic detail which consists of 4 by 2 twos complement multiplier integrated circuits. Employing 32 of these multipliers, a 16-bit twos complement number can be multiplied with a like number. Two numbers being multiplied are provided at the left-hand side of these circuits as M300 B through M315 B (from register M3) and M200 through M215 (from register M2 yet to be described). FIGS. 19-20 contain an add circuit in addition to the multiplier circuit, the add circuit being constructed from integrated circuits designated U46, U34, U47, U35, U48, U36, and U49. The total from this add circuit is designated P00-P29; P30 and P31 are signals derived from U58 from FIG. 17. This 32-bit final result, the sum of two signals, is a 32-bit number which includes 16 most significant bits (16MS) and 16 least significant bits (16LS).

Figure 17:
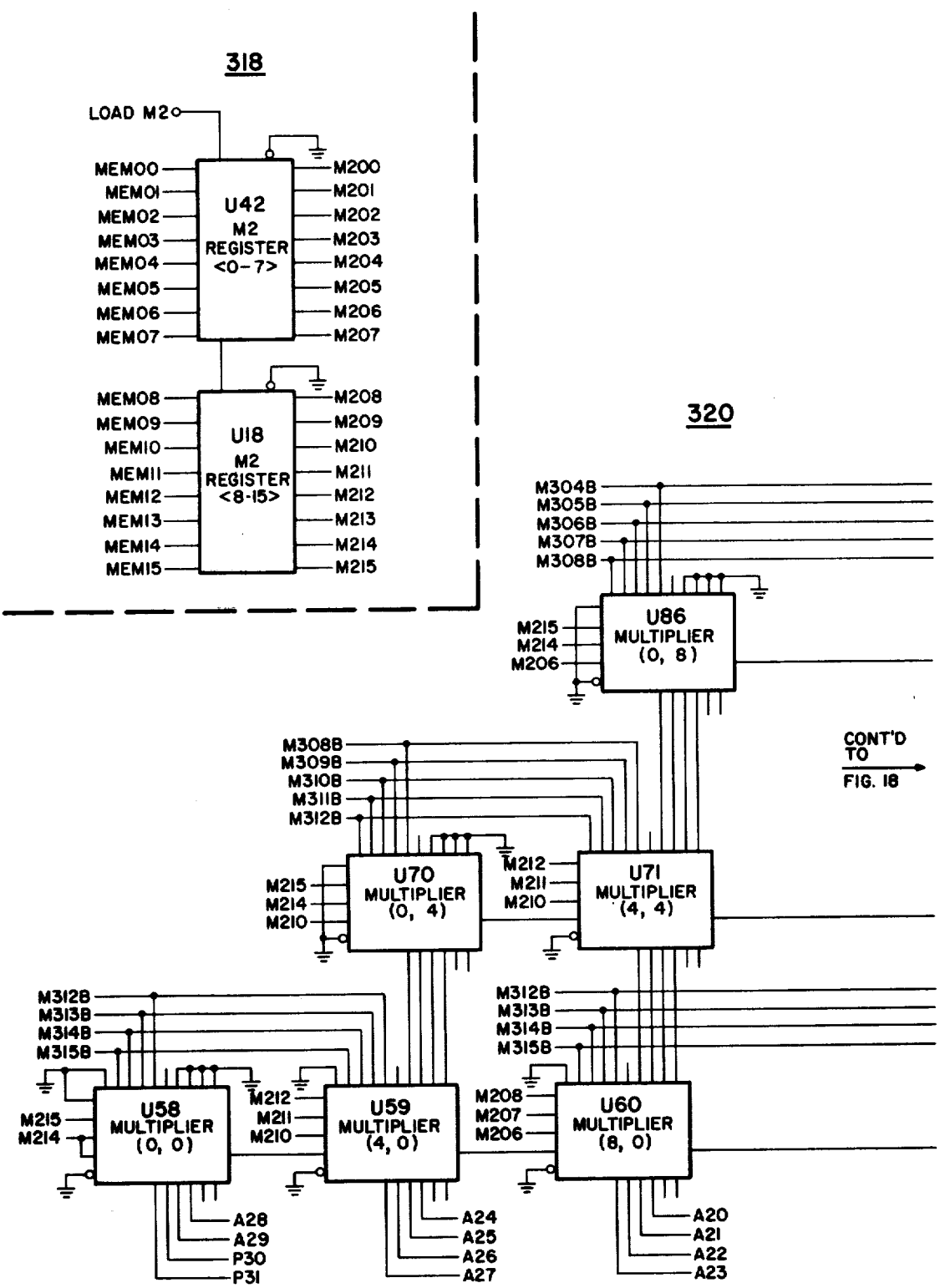
FIGS. 17 and 18 include circuit diagrams of circuitry within register 318 and multiplier 320.
Figure 18:
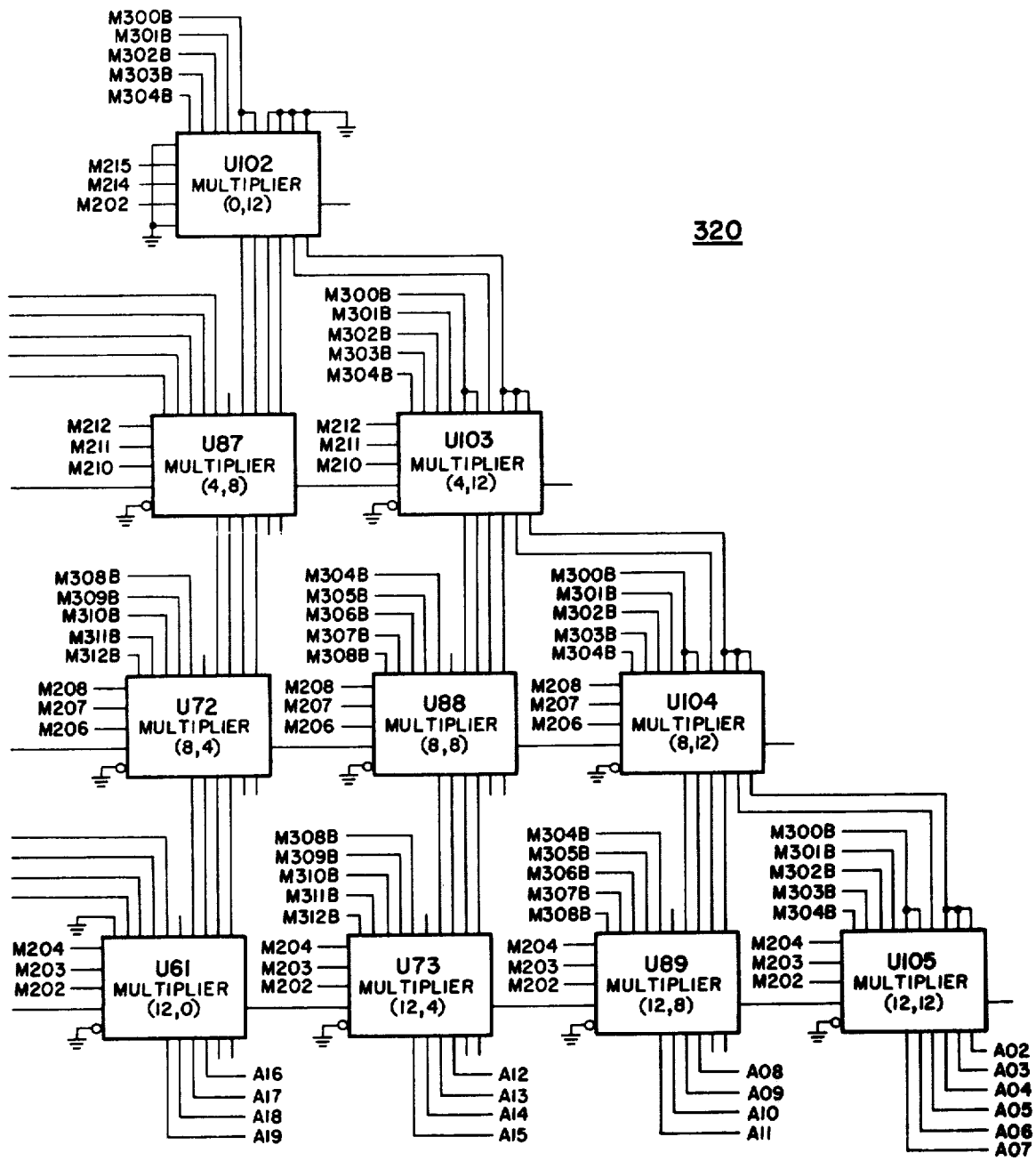

Referring to FIG. 17, it is seen that section 318, corresponding to M2 register 318 controlled by LOAD M2 receives an input from MEMBUS, MEM0-MEM15, and provides an output to one input of multiplier 320 as M200-M215, referred to above. Block 18 is a simple D-type register with 2 to 1 multiplexing.

FIG. 16

Figure 16:
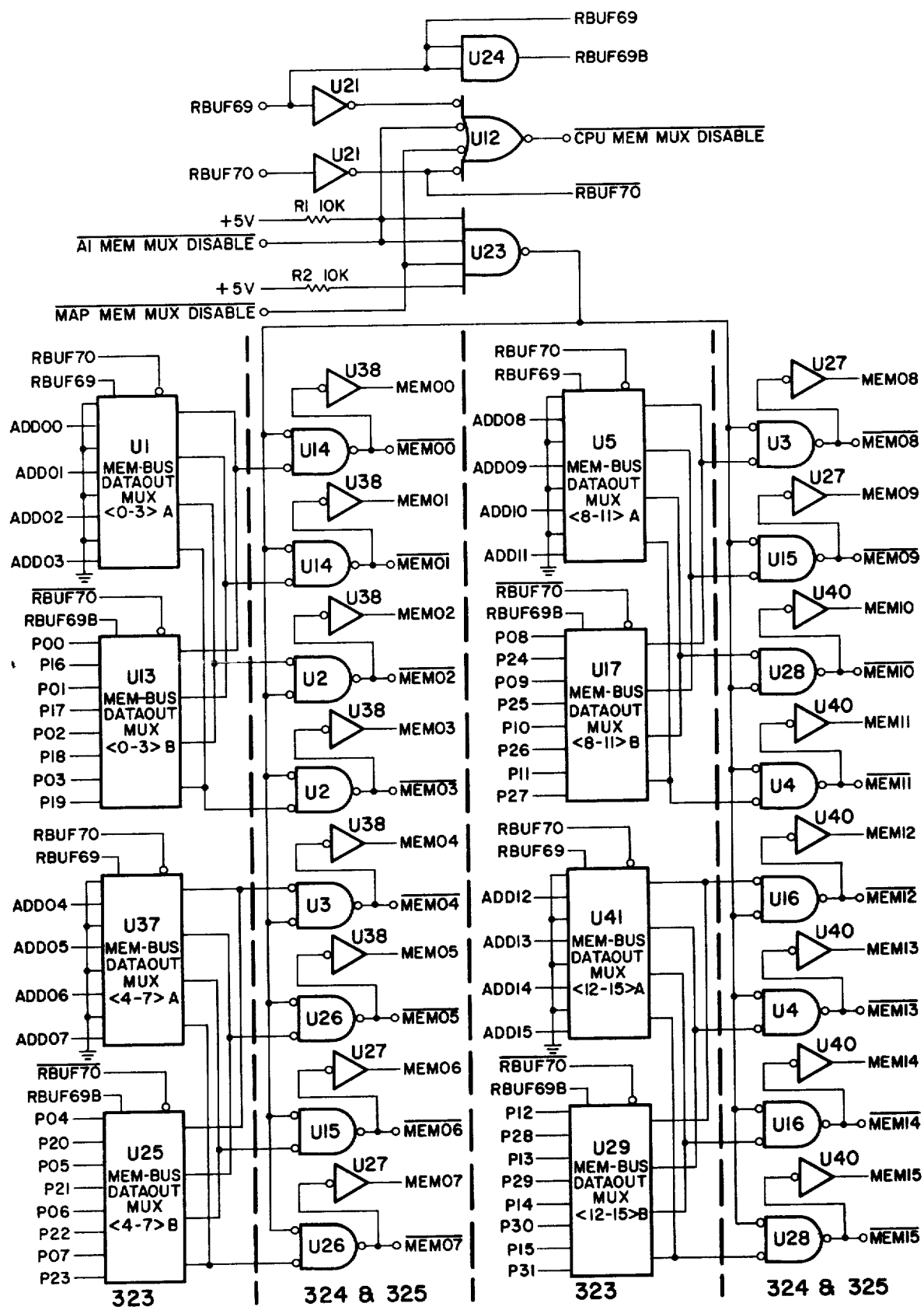
FIG. 16 includes circuit diagrams of circuitry within MUX 323, and transferring means 324, 325.

Referring next to FIG. 16, section 323 is a 1 out of 4 input multiplexer controlled by RBUF 69 and RBUF 70, having input signals from add block 321 yet to be discussed, these signals designated ADD 0–ADD 15, inclusive. Other inputs are from multiplier 320 having signals designated P0-P31. Output of MUX 323 goes to main memory, the signals being conducted via transferring means 324 and 325 and designated MEM0–MEM15.

FIG. 15

Figure 15:
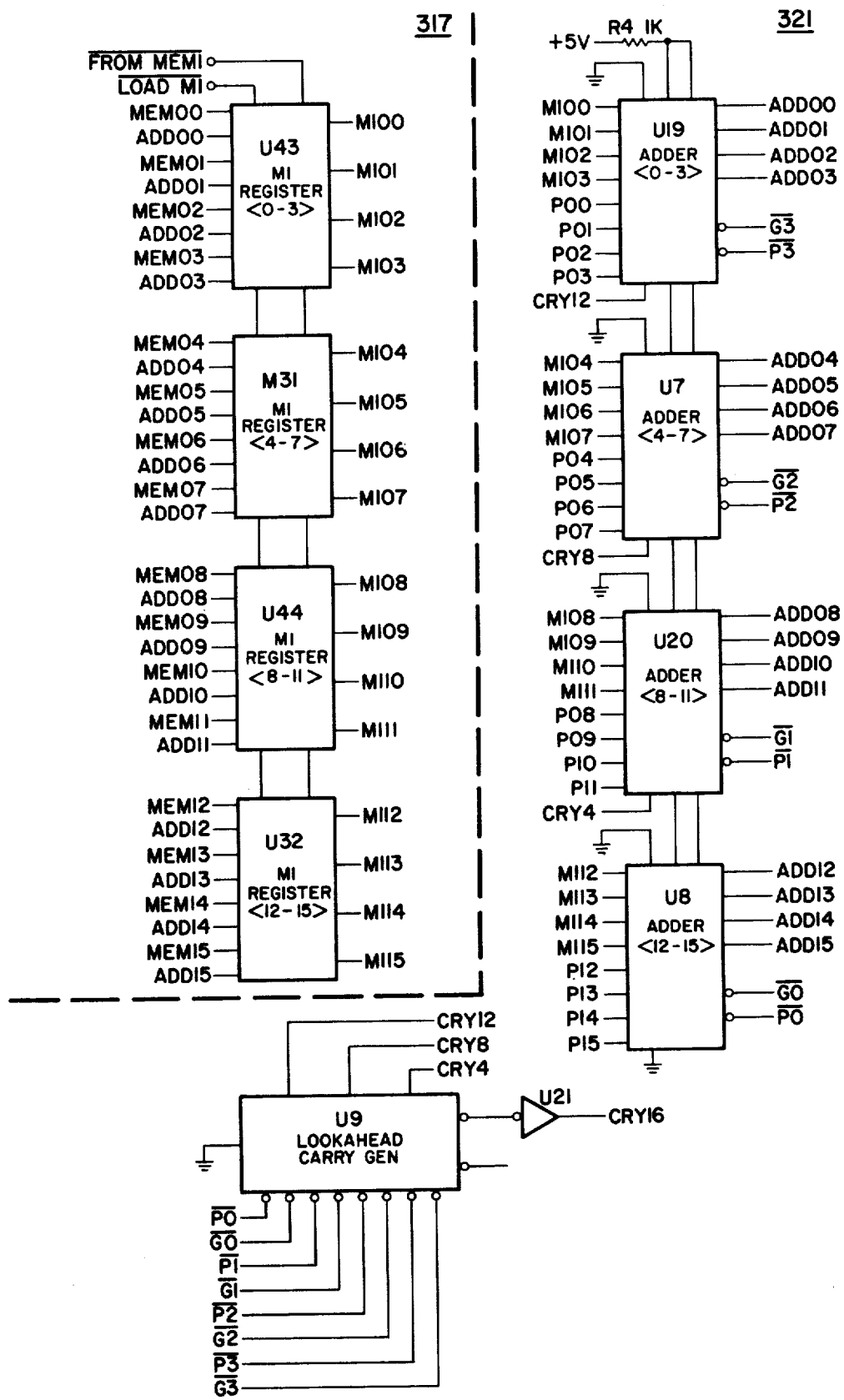
FIG. 15 includes circuit diagrams of circuitry within register 317 and adder 321.

Add block 321 in FIG. 15 comprises four integrated circuits, U19, U7, U20, U8, forming a 16-bit adder circuit. U9 is a look-ahead carry IC having its inputs derived from the output of adder 321 and providing CRY 4, CRY 8, and CRY 12 signals to integrated circuits U20, U7, and U19, respectively, for purposes of obtaining fast operation. Add circuit 321 thus combines signals M100-M115, the 16 bits stored in register M1 with signals P0-P15, the most significant 16 bits from multiplier 320.

FIG. 15 includes section 317, providing schematic detail of M1 register 317. This register has two inputs, one from add block 321, those inputs being designated ADD O-Add 15, and the other input from MEMBUS by way of receiver 325 and designated MEM 0–MEM 15. The register is comprised of four integrated circuits U43, U31, U44 and U32 which are D-type flip-flops controlled by $\overline{\text{LOAD M1}}$ and $\overline{\text{FROM MEM1}}$, with the two inputs multiplexed into the output. When signal $\overline{\text{LOAD M1}}$ goes from high to low, MEM0-MEM15 are loaded into this register; when control signal $\overline{\text{FROM MEM1}}$ is high, output of adder 321 ADD 0–ADD 15 is loaded into register M1. These load signals or control signals are derived from decoder control block 301.

FIG. 19

Overflow detect logic 111'-C is included on FIG. 19 merely for purposes of economy of drawing space. This circuitry is part of interface 111' and is designated to detect overflow. Flip-flop U10 is controlled by signals $\overline{\text{RBUF 35}}$ through $\overline{\text{RBUF 37}}$, these signals being derived from the CPU as shown in FIG. 1. When these three signals are valid, they specify one out of four possible inputs that should be gated to the external condition ($\overline{\text{EXTCOND}}$) lines, which go to the CPU. The four input signals to circuit U10, are related to signals $\overline{\text{LOAD M1}}$, DIPP, CRY16, and P00.

Conventional components can be used to implement the illustrative embodiments; the preferred embodiment employs Data General DGC 0159 inverters, 2K ¼ watt resistors, Signetics N82-S231 PROMs, Fairchild 93S43 multipliers, and D-type flip-flops and registers constructed therefrom.

OPERATION

By way of introduction to the operation of the present invention refer to FIGS. 1–5. In FIG. 1, clock 114 provides timing and synchronization pulses (not shown) to CPU 101, and by way of signal SYSCLK provides timing and synchronization pulses to the remainder of system.

Referring to interface circuitry of FIG. 4B, signal SYSCLK B, derived from CPU's SYSCLK, is received by flip-flop U51 at its CLK (clock) input, along with other CPU-generated signals $\overline{\text{INHCLK}}$ and $\overline{\text{MSINA}}$ received at other inputs. Output of U51 feeds flip-flop U44 along with signal $\overline{\text{STOP CPU}}$ which, with gates U100 and U107, generate two signals: $\overline{\text{REG CLK}}$ and $\overline{\text{PPCLK}}$. Signal $\overline{\text{PPCLK}}$ is the clock which provides timing and synchronization for PP 102. The other signal, $\overline{\text{REG CLK}}$ is used to control most of the register load gates shown in FIG. 5.

Within interface circuitry of FIG. 4A, signal PP CLK provides timing inputs to flip-flops U44, U43, and U43' which store information related to RBUF 60, RBUF 61, and RBUF 62 respectively. Also, PPCLK provides timing information to registers U50 and U49 which also provide RBUF signals $\overline{\text{RBUF 63-68}}$ (which shorthand designation means signals $\overline{\text{RBUF 63}}$ to $\overline{\text{RBUF 68}}$ inclusive), and $\overline{\text{RBUF 71-75}}$. And, PPCLK is used to generate timing pulses for flip-flop U51 used to gate $\overline{\text{RBUF 71-72}}$ through flip-flop U51 providing signals ENPP and DISSP. Signal $\overline{\text{SYSRST}}$ from the CPU resets the system by application of that signal through gate U52 (to flip-flop U44, FIG. 4B) which stops PPCLK. RA0-9 signals, derived or received from the CPU, address one of 256 words within PROM U45-U48, and store the addressed word in RBUF, as described earlier.

In decode and control circuitry of FIG. 5, signals RBUF 60-62 and RBUF 65-70 are applied to decoding circuitry, which decodes the microinstruction stored in the page two extended control store (U45-48) into signals $\overline{\text{STEP 1-4}}$ and $\overline{\text{REG 3-4}}$. The following disclosure of operation relates to control of the execution of, and to the implementation of a particular algorithm.

Data is operated upon under sequences of control signals, beginning with the sequence of control signals associated with signal $\overline{\text{STEP 1}}$, and proceeding through that sequence of control signals associated with $\overline{\text{STEP 4}}$, and then repeating the four step cycle as required. Sequence control signals $\overline{\text{STEP 1-4}}$ are applied to gating circuitry within FIG. 5; $\overline{\text{REG-3}}$ and $\overline{\text{REG-4}}$ likewise are applied to the circuitry. Output of this circuitry is a plurality of LOAD signals including: LOAD M1 (for loading M1 register 317), LOAD M3 (for loading M3 register 319), LOAD M0, (for loading M0 register 311), LOAD M2 (for loading M2 register 318), LOAD REG 1 (for loading register REG-1), LOAD REG 2 (for loading register REG-2). LOAD REG 3 (for loading register REG-3), LOAD REG 4 (for loading register REG-4), LOAD STFPR (for loading Second and Third Functions PROMs), LOAD FSFPR (for loading First and Second Functions PROMs), and finally LOAD LA (for loading the logical address register 313). Signals $\overline{\text{FROM MEM 0-6}}$ and INH MEM LOAD are derived from $\overline{\text{RBUF 65-67}}$, and ENPP via U123.

In operation, during step 1, various commands are executed. The 20-bit contents of register REG-1 are placed in ALU 303, input A, by $\overline{\text{RBUF 63-64}}$, shown in FIG. 4A and FIG. 6 (303). $\overline{\text{STEP 1}}$ is applied to register REG-1 as shown in FIG. 9 (302-A). Bits 5-19 of register REG-3 are conducted to input B of ALU 303, again controlled by $\overline{\text{RBUF 63-64}}$, and by $\overline{\text{STEP 1}}$ as shown in FIG. 10 (302-G). Then, an addition is performed on the A and B inputs of ALU 303 responsive to $\overline{\text{RBUF 63-64}}$, and its 20-bit sum is conducted to register REG-1. Bits 0-15 are conducted through MUX 308, under influence of $\overline{\text{STEP 1}}$ (FIG. 11, 308), and bits 16-19 are directly applied to register REG-1 controlled by signal LOAD REG-1 (FIG. 9, 302-A).

Continuing with step 1, inverter 304 receives ALU 303 output bits 0-12 (FIG. 8, 304) and inverts the 12bits if bit zero is a logical 1, but otherwise does not. Output of inverter 304 is applied to PROMs 305, 306, and 307 (FIG. 8), However, only PROMs 306 and 307 effectively provide inputs back to register file 302, since signal LOAD STFPR (FIG. 5) is generated responsive to $\overline{\text{STEP 1}}$, which controls inputs from Second and Third Functions PRoms to registers SECOND FUNCTION REG-1 and THIRD FUNCTION REG-1 (FIG. 10, 302 E & F).

While these control signals affect operation of the register file during step 1, signal LOAD M2 (FIG. 5 ) is generated from signal $\overline{\text{FROM MEM 2}}$, in turn from microcode signals $\overline{\text{RBUF 65-67}}$. LOAD M2 causes M2 register 318 (FIG. 17) to store a binary data word from MEMBUS, the word obtained from a particular location in main memory that was addressed by the address word in LA register 313. (The addressing was accomplished as the last operation in the sequence associated with STEP 4, yet to be described, where STEP 4 of the previous sequence just precedes STEP 1 of the present sequence.) And the CPU addresses main memory 103 with the output from MUX 323, representing the product formed in mutliplier 320.

Step 2 then begins, and a sequence similar to that of step 1 is begun. The 20 bit content of register REG-2 is placed in ALU 303, input A, by $\overline{\text{RBUF 63-64}}$ shown in FIG. 4A and FIG. 6 (303). $\overline{\text{STEP 2}}$ is applied to register REG-2 as shown in FIG. 9 (302-B). Bits 5-19 of register REG-3 are conducted to input B of ALU 303, again controlled by $\overline{\text{RBUF 63-64}}$, and by $\overline{\text{STEP 2}}$ as shown in FIG. 10 (302-H). Then an addition is performed on the A and B inputs of ALU 303 responsive to $\overline{\text{RBUF 63-64}}$, and its 20 bit sum is conducted to register REG-2. Bits 0-15 are conducted through MUX 308, under influence of $\overline{\text{STEP 2}}$ (FIG. 11, 308), and bits 16-19 are directly applied to register REG-2 controlled by signal LOAD REG-2 (FIG. 9, 302-B).

Continuing with step 2, inverter 304 receives ALU 303 output bits 0-12 (FIG. 8, 304) and inverts the 12 bits if bit zero is a logical 1, but otherwise does not. Output of inverter 304 is applied to PROMs 305, 306, and 307 (FIG. 8). However, this time, only PROMs 305 and 306 effectively provide inputs back to register file 302, since signal LOAD FSFPR (FIG. 5) is generated responsive to $\overline{\text{STEP 2}}$, which controls inputs from First and Second Functions PRoms to registers FIRST FUNCTION REG-2 and SECOND FUNCTION REG-2 (FIG. 9, 302 C & D).

While these control signals affect operation of the register file during STEP 2, signal LOAD M1 (FIG. 5) is generated from microcode signal $\overline{\text{RBUF 68}}$. LOAD M1 and FROM M1 signals cause M1 register 317 (FIG. 15) to store a binary data word obtained from MEMBUS, and derived from that location in main memory which was addressed by the CPU in previous step 1. And, the CPU decrements its accumulator (not shown). (When the accumulator contents are decremented to a value of zero, a "last element" subroutine is begun after which further operation of the P-P is halted.)

Step 3 then begins, and a new sequence of commands is initiated. Bits 8-19 of register FIRST FUNCTION REG-2 are placed in ALU 303, input A, by microinstruction $\overline{\text{RBUF 63-64}}$ (FIG. 4A and FIG. 6, 303). $\overline{\text{STEP 3}}$ is applied to register FIRST FUNCTION REG-2 as shown in FIG. 9 (302-C). Bits 8-19 of register THIRD FUNCTION REG-1 are conducted to input B of ALU 303, again controlled by $\overline{\text{RBUF 63-64}}$ and by $\overline{\text{STEP 3}}$ as shown in FIG. 10, (302-F). Then a subtraction is performed on the A and B inputs of ALU 303 responsive to $\overline{\text{RBUF 63-64}}$, and its 12 bit difference is conducted to FOURTH FUNCTION PROM 310. The output of PROM 310 is applied as one input to add-subtract 312, (signal T, FIG. 12, 312). The other input to add-subtract 312 comes from M0 register 311. If control bit 0 from REG-1 is zero, (signal $\overline{\text{BIT 0 REG-1}}$, FIG. 9, 302-A) then add-subtract 312 adds; if control bit 0 is a 1, then add-subtract 312 subtracts (FIG. 12, 312, signal BIT 0 REG-1). Output of add-subtract 312 is placed in LA register 313 responsive to control signal LOAD LA, (FIG. 12, 313).

While these control signals affect operation of the register file and add-subtract 312 during step 3, signals LOAD M1 and $\overline{\text{FROM MEM 1}}$ control M1 register 317 to provide one input to ADD 321; and, P00-P15 from multiplier 320 is another input to ADD 321. The two inputs are added and the sum is conducted to MEMBUS.

Step 4 then begins, and the final sequence of commands is initiated. Bits 8-19 of register SECOND FUNCTION REG-2 are placed in ALU 303, inpu A, by microinstruction $\overline{\text{RBUF 63-64}}$ (FIG. 4A, and FIG. 6, 303). $\overline{\text{STEP 4}}$ is applied to FIRST FUNCTION REG-2 as shown in FIG. 9 (302-D). Bits 8-19 of register SECOND FUNCTION REG-1 are conducted to input B of ALU 303, again controlled by signals $\overline{\text{RBUF 63-64}}$ and by STEP 4 as shown in FIG. 10, (302-E). Then an addition is performed on the A and B inputs of ALU 303, responsive to $\overline{\text{RBUF 63-64}}$, and its 12 bit sum is conducted to FIFTH FUNCTION PROM 316. The output of PROM 316 is applied as one 12 bit input to M3 register 319 (FIG. 14, signals $\overline{\text{STEP 4}}$ and $\overline{\text{LOAD M3}}$). The other input to M3 register 319 on bits 0 and bits 13-15 from MEMBUS are zeros. As noted earlier, (in discussion of step 1), LA REG 313 provides a 15 bit input to LA BUS thus addressing main memory thereby, responsive to STEP 4, as applied to gate U27 (FIG. 12, 313). Finally, CPU decrements its accumulator again, and step 1 through 4 are repeated unless the accumulator content is equal to zero.

Within steps 1-4, focusing specifically on registers 317, 318, 319 and associated circuitry registers 318 and 319 are two 16-bit registers which are loaded from MEMBUS 109 by way of transfer (receiver) means 325. M2 register 318 and M3 register 319 supply two 16-bit arguments to signed multiplier 320. Multiplier 320 receives these two arguments in twos complement notation, each of these arguments being 16 bits long and provides a 32-bit output by operation of the circuitry shown in FIGS. 17-20. Both higher and lower bits can be read out to MUX 323; from there either the higher 16 bits or the lower 16 bits can be read out to MEMBUS 109 by way of MUX driver 324. Thus, to perform a simple multiplication of two signed numbers, registers 318 and 319 are loaded with desired numbers and one microcycle (cycle of PPCLK) is required before 16 bits can be read from MUX 323. Either the MSB or the LSB 16 bits can be read out first. So, two numbers from main memory 103 can be read into registers M2 and M3 and its multiplied result can be written back into main memory in two consecutive words as output of signed multiplier 320.

The other circuitry associated with this multiplier includes ADD 321 and M1 register 317. This hardware is used to accomplish what is normally termed a convolution process, wherein two numbers which are multiplied in a certain order are then added to a running accumulation of the product of the two numbers. As noted earlier, numbers in M2 register 318 and M3 register 319 are multiplied together first and 16 most significant bits of its output are added to register 317. This addition is performed within ADD 321 whose inputs are output from register M1 and the 16 MSB output from multiplier 320. Output of ADD 321 is then re-supplied to register M1 so that old contents of register M1 plus the new 16-bit most significant output of multiplier 320 are added together and stored back in register M1. In this manner, numbers are continually re-loaded into registers M2 and M3 and a multiplication of those two numbers are accumulated in register M1. When the process is finished, final output can be read from ADD 321 to MUX 323 and via transfer means 324 to MEMBUS 109, back to main memory.

The two 16-bit numbers that are multiplied in signed multiplier 320 result in a 32-bit total. The 16 most significant bits of the product, P00 through P15, are added to contents of M1 register 317 bits O through 15. The result of this addition is stored back in register M1. However, in the final operation, the last multiply and add operation, output from ADD 321 is not stored back into M1 register 317. The output is placed on to MEMBUS 109 and returned to main memory.

Recapitulating, register file 302 is divided into two four-register sections; outputs of the first section of four registers provides the A input to ALU 303 and output from the other four registers provides the B input to ALU 303. There are four steps each including a command sequence, each step of which provides an input A and an input B to ALU 303. One input is taken from one of the registers of the first group, and the other input is taken from the one of the registers of the second group. Output from the ALU is then fed back to certain of the registers in the register file either directly, or through a multiplexer, or by way of being further operated upon by PROMs 305, 306 or 307. During step 3, ALU output is provided not only back to the register file but also to FOURTH FUNCTION PROM 310 which performs another operation on certain bits 9-19. During this third step, PROM 310 output and output from register 311 are combined in add-subtract block 312, which will add if bit 0 from register REG-1 is zero, but will subtract if bit 0 from REG-1 is a logical 1. Output of block 312 is stored in LA register 313, which 15 bit binary word represents an address in main memory and is used to address main memory thereby. In other words, this 15-bit word is conducted to LA BUS 108, the logical address bus, which addresses main memory thereby. During step 4, output of ALU 303 not only is fed back to register file 302 but is also conducted by way of buffer 315 to FIFTH FUNCTION PROM 316. Output from PROM 316 is then provided to register 319. Register 318 receives by way of transferring means 325 a 16-bit word from main memory, and contents of registers 318 and 319 are multiplied in multiplier 320. The convolution procedure described earlier is provided on the product formed, 16 most significant bits therefrom being conducted to add block 321 where those bits are summed with accumulated results from prior multiplications. After the convolution process is completed the accumulated product is multiplexed out by way of MUX 323 and driver 324, returning to main memory by way of MEMBUS 109. The memory location in which the convoluted product is stored may be that memory location addressed by binary word stored in LA REG 313.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In an improved binary data processing system including a main memory for storing at least said data in the form of binary words of predetermined bit length; a CPU connected from said main memory for processing said data, said CPU including clock means for providing timing signals for the operation of said system and a system controller for controlling the operation of said system, said system controller including a microprogram control store having a plurality of pages of predetermined word length and CPU interface structure including a modified microprogram control store consisting of extension of said predetermined word length of at least one of said pages, said extension having stored therein a modified microprogram; and said system further including I/O bus means connected from said CPU to outside of said system for transferring said data therebetween, the improvement comprising:

a parallel processor connected between said interface structure and said main memory for processing certain of said binary data simultaneously and synchronously with operation of said CPU, said parallel processor comprising: means for transferring said certain of said data to and from said main memory; register file means for receiving and temporarily storing at least said certain of said data from said transferring means; ALU means connected from said register file means for receiving and arithmetically manipulating inputs from said register file means and for providing a binary output representative of the result of the arithmetical manipulation; first PROM means connected from said ALU means for receiving and performing a plurality of mathematical operations on a like plurality of other binary words, each of said other binary words formed by a respective predetermined group of bits of said binary output, and for conducting results of said operations to said register file means; second PROM means for receiving and performing a second mathematical operation on another predetermined group of bits of said binary output; M0 register means for receiving and temporarily storing said certain of said data from said transferring means; means for combining the outputs of said second PROM means and said M0 register means into a binary address and for addressing said main memory with said address; third PROM means for receiving and performing a third mathematical operation on said another predetermined group of bits; other register means for receiving and temporarily storing output of said third PROM means and for receiving from said transferring means and temporarily storing said binary words of predetermined bit length; said addressing means permitting said main memory to read out to said transferring means, said binary word of predetermined bit length located at said address; multiplier means connected from said other register means for multiplying said third PROM means output with said binary word, said transferring means arranged to receive output of said multiplier means and to transfer said multiplier means output to said address; and decode and control means for decoding said modified microprogram and controlling operation of said parallel processor therewith.

2. The improvement of claim 1 and wherein said multiplier means comprises means for multiplying one with another of said binary words of predetermined bit length, forming therefrom a product binary word of twice said predetermined bit length, and writing said product binary word through said transferring means into said memory in the form of one most significant said predetermined bit length word and another least significant said predtermined bit length word.

3. The improvement of claim 1 including M1 register means for repetitively receiving and temporarily storing at least said binary words of predetermined bit length from said transferring means; and wherein said multiplier means comprises means for repetitively multiplying one with another of said binary words of predetermined bit length and forming therefrom product binary words each having a most significant said predetermined bit length word and a least significant said predetermined bit length word, means for adding each output of said M1 register means with a respective said most significant said predetermined bit length word, forming respective sums thereof, and repetitively returning each of said sums to said M1 register means, and means for inhibiting operation of said returning means by conducting said sums to said transferring means for writing of said sums into main memory.

4. The improvement of claim 1 and wherein said transferring means comprises MEMBUS drive and receiver inverter circuits.

5. The improvement of claim 1 and wherein said register file means comprises two sections of four registers each, each of said sections contributing to one of two register file outputs from said register file means.

6. The improvement of claim 5 and wherein said ALU means adds and subtracts said two register file outputs responsive to control signals from said decode and control means.

7. The improvement of claim 1 and wherein said first PROM means comprises three individual PROMs, each of said PROMs capable of storing information representing a different mathematical function.

8. In a binary information processing system, a parallel processor, connected between an interface to a CPU containing microinstructions in a CPU control store memory and main memory, and employed for aiding said CPU in the processing of said binary information simultaneously and synchronously with operation of said CPU, said processor comprising:

ALU means for receiving and arithmetically manipulating representations of said binary information and for providing a binary output representative of the result of the arithmetical manipulating;

a plurality of PROM tables receiving said binary output as inputs thereto, and providing a like plurality of PROM table outputs;

register file means receiving a first of said PROM table outputs and a first input from said main memory for providing a register file output to said ALU means;

logical address generate means receiving a second of said PROM table outputs and a second input from said main memory for providing a logical address output to said main memory;

computation means receiving a third of said PROM table outputs and a third input from said main memory for providing a computational output to said main memory and said interface;

and decode and control means receiving representations of microinstructions from said interface for controlling operation of said ALU means, said plurality of PROM tables, said register file means, said logical address generate means, and said computation means.

* * * * *